US009749333B2

(12) United States Patent
Lloyd et al.

(10) Patent No.: US 9,749,333 B2
(45) Date of Patent: Aug. 29, 2017

(54) SHARED ACCESS APPLIANCE, DEVICE AND PROCESS

(71) Applicant: Oliver Lloyd PTY Ltd. ACN 108 899 323 as Trustee of the WWITE Unit Trust, East Melbourne (AU)

(72) Inventors: Alan Charles Lloyd, Lilydale (AU); Susan Mary Oliver, East Melbourne (AU)

(73) Assignee: Oliver Lloyd Pty Ltd, East Melbourne Victoria (AU), ACN 108 900 323 as trustee of the wwITe Unit Trust ( * ) Notice: Subject to any disclaimer, the term of this patent is extended or adjusted under 35 U.S.C. 154(b) by 0 days.

(21) Appl. No.: 15/302,132

(22) PCT Filed: May 5, 2015

(86) PCT No.: PCT/AU2015/050216
§ 371 (c)(1),
(2) Date: Oct. 5, 2016

(87) PCT Pub. No.: WO2015/168736
PCT Pub. Date: Nov. 12, 2015

(65) Prior Publication Data
US 2017/0126689 A1    May 4, 2017

(30) Foreign Application Priority Data
May 5, 2014  (AU) ................................ 2014901635

(51) Int. Cl.
*H04L 9/32*      (2006.01)
*H04L 29/06*    (2006.01)
(Continued)

(52) U.S. Cl.
CPC .......... *H04L 63/102* (2013.01); *G06F 3/0482* (2013.01); *G06F 3/0488* (2013.01);
(Continued)

(58) Field of Classification Search
CPC . H04L 63/101; H04L 63/102; H04L 61/1594; H04L 67/02; H04L 67/306;
(Continued)

(56) References Cited

U.S. PATENT DOCUMENTS 7,290,129 B2 * 10/2007 Chebolu ............. G06F 9/44505
                                                                    713/150
7,356,703 B2 *  4/2008 Chebolu ............. G06F 9/44505
                                                                    713/182
(Continued)

FOREIGN PATENT DOCUMENTS

AU        2007208093 A1      8/2007
BR        PI 0707220 A2      4/2011
(Continued)

OTHER PUBLICATIONS

International Search Report, PCT/AU2015/050216, date of mailing Jun. 1, 2015 (6 pages).
(Continued)

*Primary Examiner* — Hosuk Song
(74) *Attorney, Agent, or Firm* — Nixon Peabody LLP

(57) ABSTRACT

A shared access user appliance having a client component; a server component; interactive user components providing functions to a first user; an interactive access management component allowing the first user to select second users, and select whether to grant or deny access to the user components for the second users; and a control component generating access control data and granting or denying access to the user components for the second users. The server component generates an appliance graphical user interface representing an interactive user environment including independently selectable graphical objects. Selecting each graphical object causes the server to modify the appliance graphical user interface to include the graphical user interface of the interactive user component. The server compo-
(Continued)

nent receives requests from other users and sends a graphical user interface of the interactive user component for display only if the access data indicates the first user has allowed the second user access.

41 Claims, 18 Drawing Sheets

(51) Int. Cl.
- *H04L 29/08* (2006.01)
- *H04L 29/12* (2006.01)
- *G06F 3/0481* (2013.01)
- *G06F 3/0482* (2013.01)
- *G06F 3/0484* (2013.01)
- *G06F 3/0488* (2013.01)

(52) U.S. Cl.
CPC ...... *G06F 3/04817* (2013.01); *G06F 3/04842* (2013.01); *G06F 3/04847* (2013.01); *H04L 61/1594* (2013.01); *H04L 67/02* (2013.01); *H04L 67/306* (2013.01); *H04L 67/42* (2013.01)

(58) Field of Classification Search
CPC ......... H04L 67/42; G06F 21/30; G06F 21/31; G06F 21/36; G06F 3/04817; G06F 3/0482; G06F 3/04842
USPC ..... 726/2–4, 27–30; 709/217, 219, 225, 229
See application file for complete search history.

(56) References Cited

U.S. PATENT DOCUMENTS

| | | | |
|---|---|---|---|
| 7,475,353 B2 * | 1/2009 | Nuzzi | G06F 17/30899 705/76 |
| 7,500,597 B2 | 3/2009 | Mann | |
| 7,509,249 B2 | 3/2009 | Britt | |
| 7,593,780 B2 | 9/2009 | Mann | |
| 7,870,153 B2 | 1/2011 | Croft | |
| 7,913,300 B1 * | 3/2011 | Flank | G06F 9/468 709/202 |
| 7,930,635 B2 | 4/2011 | Mann | |
| 7,949,677 B2 | 5/2011 | Croft | |
| 7,954,150 B2 | 5/2011 | Croft | |
| 8,010,679 B2 | 8/2011 | Low | |
| 8,051,180 B2 | 11/2011 | Mazzaferri | |
| 8,117,314 B2 | 2/2012 | Croft | |
| 8,151,196 B2 | 4/2012 | Britt | |
| 8,341,270 B2 | 12/2012 | Mazzaferri | |
| 8,341,732 B2 | 12/2012 | Croft | |
| 8,355,407 B2 | 1/2013 | Wookey | |
| 8,639,491 B2 | 1/2014 | Mann | |
| 8,738,693 B2 * | 5/2014 | Julia | H04N 1/00137 709/204 |
| 8,875,040 B2 | 10/2014 | Mann | |
| 8,898,123 B2 | 11/2014 | Britt | |
| 8,918,733 B2 | 12/2014 | Britt | |
| 8,970,647 B2 * | 3/2015 | Alsina | G06F 9/4445 715/766 |
| 8,984,423 B2 | 3/2015 | Mann | |
| 8,984,657 B2 | 3/2015 | Nerger | |
| 9,213,463 B2 * | 12/2015 | Freedman | G06K 9/00476 |
| 9,325,503 B2 * | 4/2016 | Marten | H04L 9/3226 |
| 2005/0234864 A1 | 10/2005 | Shapiro | |
| 2006/0095855 A1 | 5/2006 | Britt | |
| 2006/0277026 A1 | 12/2006 | Mann | |
| 2006/0277027 A1 | 12/2006 | Mann | |
| 2006/0277194 A1 | 12/2006 | Britt | |
| 2006/0277461 A1 | 12/2006 | Britt | |
| 2006/0277463 A1 | 12/2006 | Mann | |
| 2006/0277479 A1 | 12/2006 | Britt | |
| 2006/0277498 A1 | 12/2006 | Mann | |
| 2006/0277499 A1 | 12/2006 | Britt | |
| 2006/0288105 A1 | 12/2006 | Britt | |
| 2007/0033538 A1 | 2/2007 | Mann | |
| 2007/0055385 A1 | 3/2007 | Mann | |
| 2007/0055386 A1 | 3/2007 | Mann | |
| 2007/0171921 A1 | 7/2007 | Wookey | |
| 2007/0174410 A1 | 7/2007 | Croft | |
| 2007/0174429 A1 | 7/2007 | Mazzaferri | |
| 2007/0180447 A1 | 8/2007 | Mazzaferri | |
| 2007/0180448 A1 | 8/2007 | Low | |
| 2007/0180449 A1 | 8/2007 | Croft | |
| 2007/0180450 A1 | 8/2007 | Croft | |
| 2007/0180493 A1 | 8/2007 | Croft | |
| 2007/0186212 A1 | 8/2007 | Mazzaferri | |
| 2007/0192329 A1 | 8/2007 | Croft | |
| 2007/0198656 A1 | 8/2007 | Mazzaferri | |
| 2010/0146418 A1 | 6/2010 | Mann | |
| 2011/0004888 A1 | 1/2011 | Scrinivasan | |
| 2011/0082900 A1 | 4/2011 | Nagpal | |
| 2011/0145932 A1 | 6/2011 | Nerger | |
| 2012/0052468 A1 | 3/2012 | Granpeesheh | |
| 2012/0141971 A1 | 6/2012 | Granpeesheh | |
| 2012/0240049 A1 | 9/2012 | Britt | |
| 2015/0045918 A1 | 2/2015 | Mann | |
| 2015/0081781 A1 | 3/2015 | Britt | |

FOREIGN PATENT DOCUMENTS

| | | |
|---|---|---|
| CA | 2637980 A1 | 8/2007 |
| CN | 101410803 A | 4/2009 |
| EP | 1732000 A2 | 12/2006 |
| EP | 1736854 A2 | 12/2006 |
| EP | 1736868 A2 | 12/2006 |
| EP | 1977317 A1 | 10/2008 |
| EP | 2278458 A1 | 1/2011 |
| EP | 2369479 A2 | 9/2011 |
| EP | 2375328 A2 | 10/2011 |
| EP | 2561689 A2 | 2/2013 |
| IL | 192910 A | 12/2012 |
| WO | WO 2005/103881 A2 | 11/2005 |
| WO | WO 2006/050529 A1 | 5/2006 |
| WO | WO 2007/087558 A2 | 8/2007 |
| WO | WO 2007/100942 A2 | 9/2007 |
| WO | WO 2011/037741 A2 | 3/2011 |

OTHER PUBLICATIONS

Written Opinion of the International Searching Authority, PCT/AU2015/050216, date of mailing Jun. 1, 2015 (4 pages).

* cited by examiner

SHARED ACCESS APPLIANCE, DEVICE AND PROCESS

CLAIM OF PRIORITY

This application claims priority from Australian Patent Application No. 2014901635 filed May 5, 2014 and PCT Application No. PCT/AU2015/050216 filed May 5, 2015. Those applications are incorporated by reference in their entirety.

TECHNICAL FIELD

The present invention relates to a shared access user appliance or device and process, and in particular to a shared access user appliance or device and process that provide an interactive user environment having independently accessible interactive user components, and allow a user to independently control access to each of the interactive user components of the user to other users of shared access user appliances or devices.

BACKGROUND

The continuing expansion of the Internet and social media into organisations and the personal and working lives of individuals has completely changed the way that we work and live in the 21$^{st}$ century. A particularly significant aspect of this revolution has been the ability to easily and immediately share information and to remotely access such information and other computer based resources.

Notwithstanding the developments described above, there remain significant opportunities for the use of these and similar technologies to assist the disadvantaged, including the elderly and handicapped. However, these opportunities continue to face significant technical challenges that have prevented their uptake on a large scale, including ease-of-use for inexpert users, difficulties associated with remote assistance, personal information security, and the management of trusted relationships.

It is desired to provide a shared access appliance, device or process that alleviates one or more difficulties of the prior art, or that at least provides a useful alternative.

SUMMARY

In accordance with some embodiments of the present invention, there is provided a shared access user appliance or device, including:
- a client component;
- a server component;
- a plurality of interactive user components configured to provide respective different functions to a user ("the first user") of the shared access user appliance or device via respective graphical user interfaces of the interactive user components;
- an interactive access management component configured to allow the first user to select one or more other users ("second users") of one or more shared access user appliances or devices, and to independently select whether to grant or deny access to each of the different interactive user components of the first user for each of the selected second users;
- at least one access control component configured to generate access control data corresponding to the first user's selections, and to independently grant or deny access to each of the interactive user components of the first user for each of the second users;

wherein the server component is configured to generate an appliance graphical user interface representing an interactive user environment of the first user for display to the first user, the interactive user environment including independently selectable graphical objects representing the interactive user components of the first user, selection of each said graphical object causing the server to modify at least a corresponding portion of the appliance graphical user interface to include the graphical user interface of the corresponding interactive user component of the first user; and wherein the server component is further configured to receive requests to access corresponding ones of the interactive user components of the first user from other users of shared access user appliances or devices, and, for each said request, to send a graphical user interface of the corresponding interactive user component of the first user for display on the corresponding shared access user appliance or device of the corresponding second user only if the generated access control data indicates that the first user has allowed the corresponding second user access to the corresponding interactive user component of the first user.

In some embodiments, the requests are received from shared access user appliances or devices of the second users via a communications network, and the server component is configured to send the graphical user interface of the corresponding interactive user component of the first user to the shared access user appliance or device of the second user via the communications network.

In some embodiments, said interactive functions of said first user include one or more of: an alarm or domestic or electrical appliance control function, a messaging function, an event calendar function, a telephone function, a document management function, a picture management function, an online shopping function, a medical and prescription management function, and an address book function.

In some embodiments, said interactive functions of said first user include at least three functions of: an alarm or domestic or electrical appliance control function, a messaging function, an event calendar function, a telephone function, a document management function, a picture management function, an online shopping function, a medical and prescription management function, and an address book function.

In some embodiments, said interactive functions of said first user include: an alarm or domestic or electrical appliance control function, a messaging function, an event calendar function, a telephone function, a document management function, a picture management function, an online shopping function, a medical and prescription management function, and an address book function.

In some embodiments, the at least one access control component is configured to independently grant or deny access to each of the different interactive user components of the first user on the basis of a role or relationship of the corresponding second user relative to the first user, the role or relationship being defined by the access control data.

In some embodiments, the interactive access management component is configured to allow the first user to select the one or more second users by selecting respective images of the one or more other users from an image-based address book that is synchronized across the shared access user appliance or device of the first user and shared access user appliances or devices of other users.

In some embodiments, the appliance is a software appliance. In other embodiments, the appliance is a pre-configured hardware appliance.

In accordance with some embodiments of the present invention, there is provided, in a user appliance or device including:
- a client component;
- a server component;
- a plurality of interactive user components configured to provide respective different functions to a user ("the first user") of the shared access user appliance or device via respective graphical user interfaces of the interactive user components;
- an interactive access management component; and
- at least one access control component;

a shared access process, including:
- generating, by the server component, an appliance graphical user interface representing an interactive user environment of the first user for display to the first user, the interactive user environment including independently selectable graphical objects representing the interactive user components of the first user, selection of each said graphical object causing the server to modify at least a corresponding portion of the appliance graphical user interface to include the graphical user interface of the corresponding interactive user component of the first user;
- receiving, by the interactive access management component and from the first user via the client component, access selection data representing the first user's selections of one or more second users and, for each of the selected second users, whether to independently grant or deny the second user access to each of the different interactive user components of the first user;
- processing, by the at least one access control component, the access selection data to generate access control data corresponding to the first user's selections;
- receiving, by the server component, requests to access corresponding ones of the interactive user components of the first user from second users of respective shared access user appliances or devices;
  - processing, by the at least one access control component, each of the received requests and the generated access control data to determine whether to grant or deny the corresponding second user access to the corresponding one of the interactive user components of the first user; and
- only if said access is granted, the server component sending to the corresponding second user the graphical user interface of the corresponding interactive user component of the first user for display on the corresponding shared access user appliance or device of the corresponding second user.

In some embodiments, the requests are received from the shared access user appliances or devices of the second users via a communications network, and the server component sends the graphical user interface of the corresponding interactive user component of the first user to the shared access user appliance or device of the second user via the communications network.

In some embodiments, said functions of said first user include one or more of: an alarm or domestic or electrical appliance control function, a messaging function, an event calendar function, a telephone function, a document management function, a picture management function, an online shopping function, a medical and prescription management function, and an address book function.

In some embodiments, said functions of said first user include at least three functions of: an alarm or domestic or electrical appliance control function, a messaging function, an event calendar function, a telephone function, a document management function, a picture management function, an online shopping function, a medical and prescription management function, and an address book function.

In some embodiments, said functions of said first user include: an alarm or domestic or electrical appliance control function, a messaging function, an event calendar function, a telephone function, a document management function, a picture management function, an online shopping function, a medical and prescription management function, and an address book function.

In some embodiments, the processing of each of the received requests and the generated access control data includes determining whether to grant or deny the corresponding second user access to the corresponding one of the interactive user components of the first user on the basis of a role or relationship of the corresponding second user relative to the first user, the role or relationship being defined by the access control data.

In some embodiments, the access selection data represents the first user's selections of one or more images of the second users from an image-based address book, and the process includes synchronizing the image-based address book across the shared access user appliance or device of the first user and shared access user appliances or devices of other users.

In accordance with some embodiments of the present invention, there is provided, at least one computer-readable storage medium having stored thereon processor executable instructions that, when executed by at least one processor of a computing device, cause the at least one processor to execute any one of the above processes.

In accordance with some embodiments of the present invention, there is provided a shared access process executed by a device of a first user, including:
- accessing first graphical user interface data representing a graphical user interface of the first user for display on said device of said first user, the graphical user interface including a plurality of selectable components selectable by said first user to independently access respective interactive functions of said first user;
- said graphical user interface of said first user including one or more access control components that allow the first user to generate access control data that is used to independently determine whether to allow or deny remote access to each of said interactive functions of said first user by at least one second user over a communications network;
- receiving, from a device of a said second user via the communications network, request data representing requests of the second user to access respective ones of the interactive functions of said first user;
- processing said request data and said access control data to independently determine, for each of said requests, whether to allow or deny access of said second user to the corresponding interactive function of said first user; and
- sending, to said device of said second user, second graphical user interface data representing a modified version of the graphical user interface of the first user for display on said device of said second user, such that the modified graphical user interface of the first user does not allow access to those interactive functions of said first user for which access was denied, and allows access to those interactive functions of said first user for which access was granted.

In some embodiments, said functions of said first user are selected from: an alarm or domestic or electrical appliance control function, a messaging function, an event calendar function, a telephone function, a document management function, a picture management function, an online shopping function, a medical and prescription management function, and an address book function.

In some embodiments, said functions of said first user include at least three functions selected from: an alarm or domestic or electrical appliance control function, a messaging function, an event calendar function, a telephone function, a document management function, a picture management function, an online shopping function, a medical and prescription management function, and an address book function.

In some embodiments, said functions of said first user include: an alarm or domestic or electrical appliance control function, a messaging function, an event calendar function, a telephone function, a document management function, a picture management function, an online shopping function, a medical and prescription management function, and an address book function.

In accordance with some embodiments of the present invention, there is provided a shared access process executed by a device of a first user, including:

accessing first graphical user interface data representing a graphical user interface of the first user for display on said device of said first user, the graphical user interface including a plurality of selectable components selectable by said first user to independently access respective interactive functions of said first user, said functions respectively providing at least three of: alarm or domestic or electrical appliance control, messaging, event calendars, telephone, document management, picture management, online shopping, medical and prescription management and address book services;

said graphical user interface of said first user including access control components that allow the first user to generate access control data that is stored only on the device of the first user and can be used to independently allow or deny remote access of each of a plurality of second users to each of said functions of said first user over a communications network;

receiving, from a device of one of said second users via the communications network, request data representing a request of the second user to access said device of said first user;

processing said request data and said access control data to independently determine, for each of said functions of said first user, whether to allow or deny said second user access to the corresponding function of said first user; and sending, to said device of said second user, second graphical user interface data representing a modified version of the graphical user interface of the first user for display on said device of said second user, such that the modified graphical user interface of the first user does not allow access to those functions of said first user for which access was determined to be denied.

In some embodiments, the access control data can be used to independently allow or deny said remote access of each of said plurality of second users based on a relationship of the second user to the first user.

In some embodiments, the access control data is owned and stored only on said device of said first user, but corresponding user and device identification data of said access control data is stored on a server in communication with said device of said first user and said device of said second user.

In some embodiments, said device of said second user can access said server to determine said user and device identification data of said access control data, and can access said device of said first user based on said user and device identification data of said access control data.

In some embodiments, said server redirects said device of said second user to said device of said first user based on said user and device identification data of said access control data.

In some embodiments, said server includes an HTTP server.

In some embodiments, said second graphical user interface data is sent to said device of said second user over a first secure communications channel, and access control and address book information is communicated to said device of said second user over a second secure communications channel.

In some embodiments, said plurality of selectable components are independently selectable by said first user to cause respective further graphical user interfaces to be displayed to said first user, each of said further graphical user interfaces providing access to a corresponding one of said interactive functions of said first user.

In some embodiments, selection of a selected one of said selectable components causes the corresponding one of the further graphical user interfaces to be displayed together with the graphical user interface of the first user.

In some embodiments, the access control components include an interactive address book component that allows the first user to select the at least one second user from a list of users of a shared user address book that is synchronized across the device of the first user and devices of respective second users In accordance with some embodiments of the present invention, there is provided at least one computer readable storage medium having stored thereon processor executable instructions that, when executed by at least one processor of a computing device, cause the at least one processor to execute the process of any one of the above processes.

In some embodiments, the processor executable instructions includes instructions to boot the at least one processor such that the processor executable instructions constitute a software appliance.

In accordance with some embodiments of the present invention, there is provided a shared access user device, including at least one processor, a memory in communication with the at least one processor, and a network interface for sending data to and receiving data from a communications network, the at least one processor being configured to execute the process of any one of the above processes.

In some embodiments, the shared access user device is configured as a computing appliance.

In accordance with some embodiments of the present invention, there is provided a shared access system, including a plurality of the above shared access user devices, the shared access user devices being in mutual communication via a communications network.

In some embodiments, the shared access system includes a server in communication with the plurality of shared access user devices.

In some embodiments, each shared access user device includes a touch screen. In some embodiments, each shared access user device is in the form of a touch screen tablet computer.

In some embodiments, the interactive functions of said first user include at least three of domestic or electrical appliance control, telephone, messaging, calendar, document, image, shopping, medical, and green cross functions.

In some embodiments, the interactive functions of said first user include at least five of domestic or electrical appliance control, telephone, messaging, calendar, document, image, shopping, medical, and green cross functions.

In some embodiments, the interactive functions of said first user include domestic or electrical appliance control, telephone, messaging, calendar, document, image, shopping, medical, and green cross functions.

In accordance with some embodiments of the present invention, there is provided a shared access device, including:
- at least one processor;
- a memory in communication with the at least one processor;
- a network interface for sending data to and receiving data from a communications network; and
- a non-volatile storage medium having stored thereon instructions that, when executed by the at least one processor, cause the at least one processor to execute the steps of:
- accessing first graphical user interface data representing a graphical user interface of the first user for display on said device of said first user, the graphical user interface including a plurality of selectable components selectable by said first user to access respective interactive functions of said first user;
- said graphical user interface of said first user including access control components that allow the first user to generate access control data that can be used to independently allow or deny remote access of each of a plurality of second users to each of said functions of said first user over a communications network;
- receiving, from a device of one of said second users via the communications network, request data representing a request of the second user to access said device of said first user;
- processing said request data and said access control data to independently determine, for each of said functions of said first user, whether to allow or deny said second user access to the corresponding function of said first user; and
- sending, to said device of said second user, second graphical user interface data representing a modified version of the graphical user interface of the first user for display on said device of said second user, such that the modified graphical user interface of the first user does not allow access to those functions of said first user for which access was determined to be denied.

In some embodiments, the shared access process includes a web server component that executes said steps of receiving and processing, and a web browser component that receives and processes said first graphical user interface data to generate said graphical user interface of the first user.

BRIEF DESCRIPTION OF THE DRAWINGS

Some embodiments of the present invention are hereinafter described, by way of example only, with reference to the accompanying drawings, wherein.

DETAILED DESCRIPTION

Figure 1:
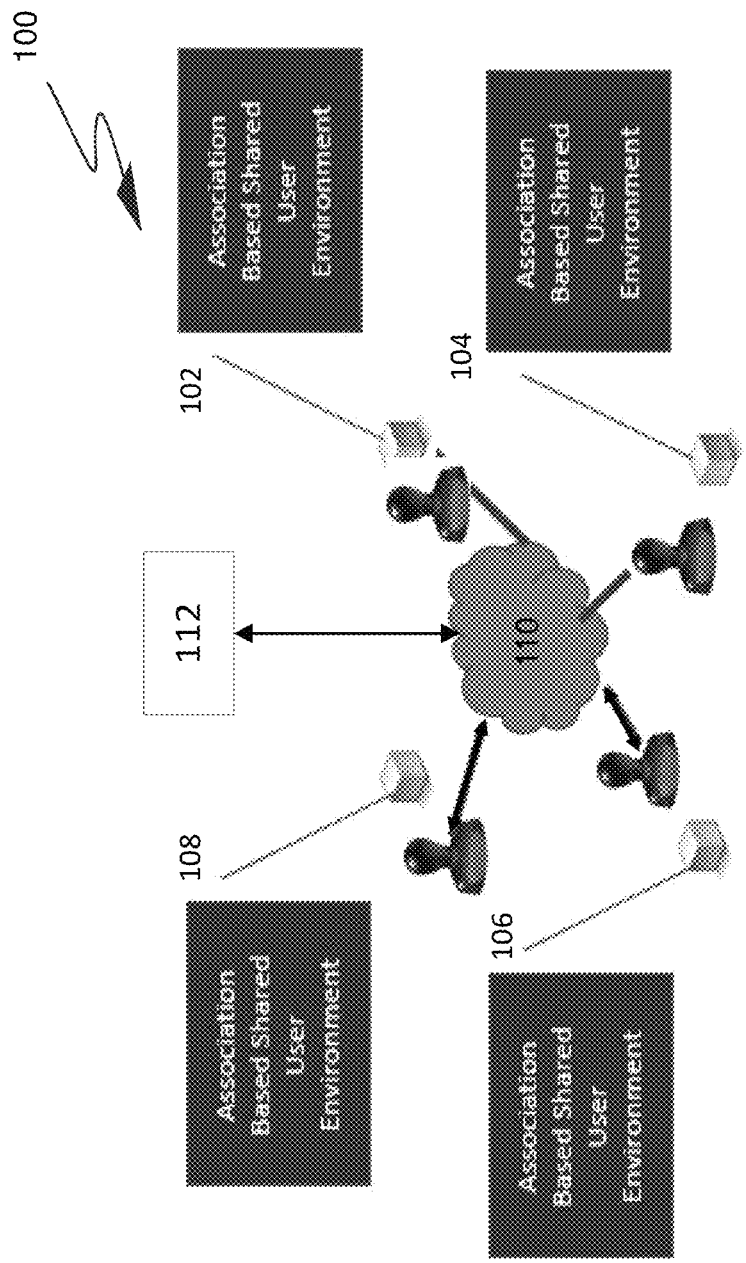
FIG. 1 is a schematic diagram of a shared access system in accordance with the described embodiments of the present invention in which one or more of the end-user functional components of a user device of a first user can be remotely accessed to configurable degrees by one or more other (second) users via their respective user devices.

With regard to the difficulties described above, the inventors have identified that there are particular shortcomings in the currently available methods of remotely accessing computers and their services/applications, in particular for the purpose of remotely assisting elderly or handicapped users of computer systems.

These existing methods are relatively inflexible, and are mostly based on a client-server paradigm where remote access to services/applications is determined based on access control data (also referred to herein for brevity as "access data") that is defined and stored for each individual's service environment in the remote server or a third party's system for the specific service/application concerned.

For example, prior art computer sharing technologies typically involve several user-user access profiles, such as:

a) the desktop/screen mode sharing of a user's machine, operating system, files and applications. This mode of sharing is normally actioned on a case by case basis to provide support of the operating system or one or more of its applications or for IT and PC training, and is normally performed by reasonably IT literate users. In most cases, user to user voice contact is also used at the same time to coordinate activities. In this mode of working, the shared system becomes the server and the accessing system acts as the client. However, such methods of sharing are inflexible, much too complicated for inexpert users, and rely on a standard keyboard, mouse and operating system graphics, which may not be workable for the partially sighted or disabled.

b) standard internet browser applications, where the user is a client accessing a web enabled business using an application server. In this case, the user's name, password and other details are registered with the business concerned. For many who are not IT literate or are aged, the internet and online businesses represent 'big brother' and a risk to privacy, and cause confusion as to what they do, and may even be considered to provide unnecessary applications in the user's life. For example, undesirable aspects of current online care via a standard client-server—web browser to server method cause aged users to be exposed to: (i) the internet at large, including pop-ups, viruses, software updates, advertising, and (ii) a multitude of web based applications for particular aspects of support of which each and every one requires user configuration data to be issued to the corresponding application provider.

The implications of such client-server operations are that the end user usually has many online service providers to deal with, and is forced to adopt and trust the user interface characteristics, name formats, functional models, information management, security and privacy regimes that the third party chooses to supply.

Service profiles and characteristics can be very different from service provider to service provider, and in particular where the service provider's address book methods and designs are different and incompatible, communicating online with other users in this way can become too complicated for inexpert users: a situation which then promotes such users to isolate themselves, isolation being a noted cause of mental health disorders in the aging population. By implication, the demands on the user to deal with a set of fragmented and remotely controlled services in this way is far too complex and daunting for those who are aged and disabled, or who do not trust a "big brother" regime (be forced to trust those they cannot see), or who are simply not IT/internet literate.

Recognising the deficiencies in existing access sharing systems and methods, the inventors have developed the system, device, and processes described herein which provide a solution to the difficulties described above using a community network approach in which all of the user "appliances" in the system have an easy to configure set of capabilities in terms of interrelating their user's needs and interests through various levels of trust.

Described herein is an entirely new user to user networked interaction architecture and process for providing configurable access for any number of remote second users to one or more of the end-user functional components (in the described embodiments, being in the form of end-user services/applications) of a user device of a first user. Embodiments of the present invention are described herein in the context of providing services to an elderly or otherwise handicapped user (generally referred to herein for convenience as the "first user" or "end user") and providing a configurable degree of remote access to each of those services of the first user to one or more other ('second') users. However, it will be apparent to those skilled in the art that the systems and processes described herein can be more generally used to control access to any of a wide variety of end-user services/applications/functions of a wide variety of possible types of users, online user to online user relationships, and/or organisations.

As shown in FIG. 1, in the described embodiments, a shared access system 100 consists of shared access user devices 102 to 108 interconnected by a communications network 110, and in some embodiments also includes a domain server 112, as described below. In the described embodiments, the communications network 110 is a wide area network (WAN), such as the Internet, although it typically also includes at least one (typically wireless) local area network (LAN) component. However, it will be apparent to those skilled in the art that in general the user devices 102 to 108 can be interconnected by essentially any type of communications network. For example, the communications network 110 may include one or more wired and/or wireless network links. The wireless links (if any) may include any suitable form of wireless networking, including cellular data networks and/or Wi-Fi, for example. In some embodiments, the communications network 110 may be a local area network (LAN).

Purely for the purpose of description, one of the devices 102 is described as being co-located with a first user (also referred to herein as the 'end user') who is to be provided with various services/applications, and the other devices 104 to 108 are described as being co-located with respective other ('second') users, each of whom has a corresponding relationship or 'association' with the first user. In the context of the described embodiments, a common feature of these relationships or associations is that they all relate to providing different types and/or levels of assistance or care to the first/end user via the corresponding user devices 102 to 108.

Figure 2:
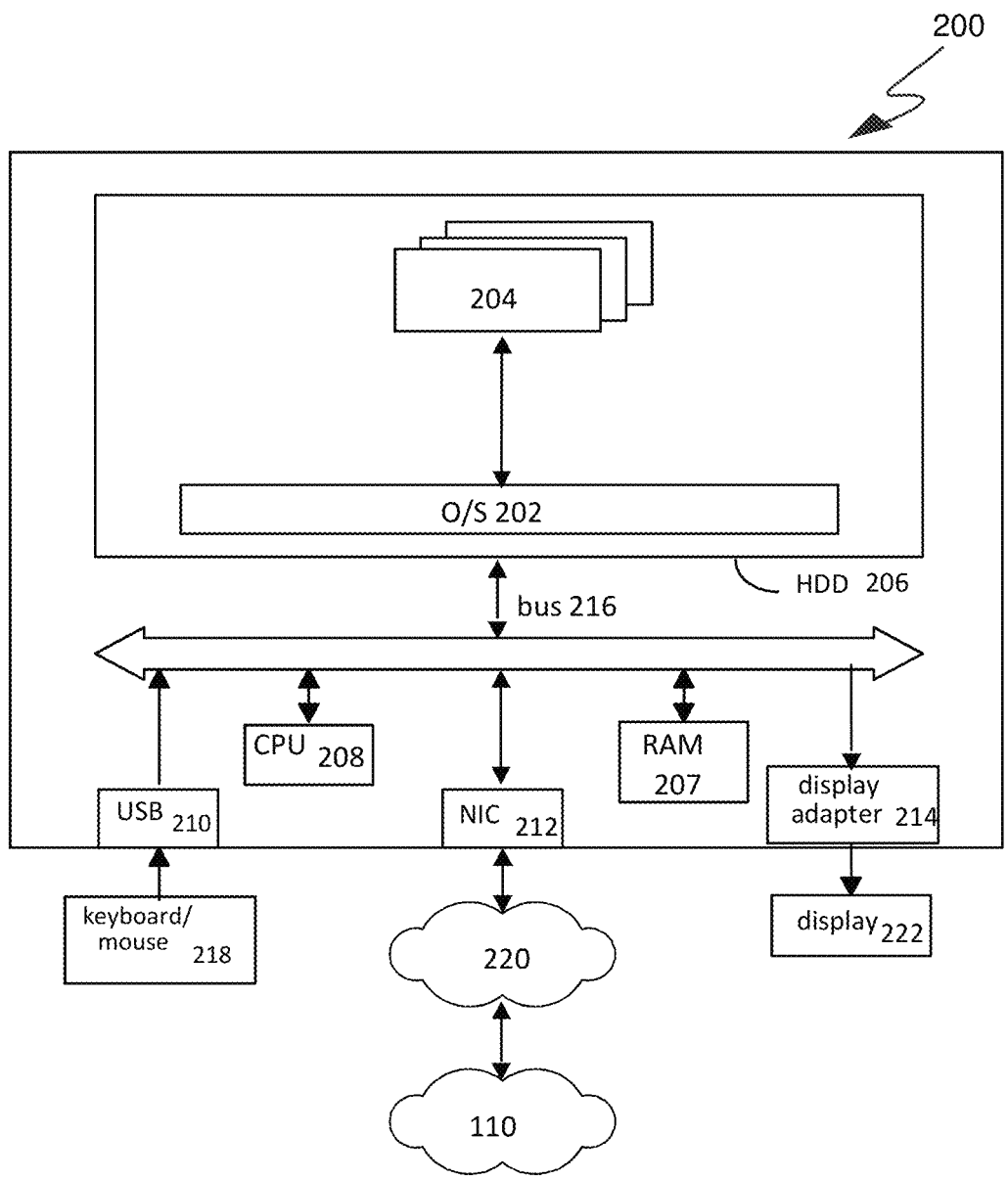
FIG. 2 is a block diagram of a user device of the system of FIG. 1.

In the described embodiments, each of the shared access user devices 102 to 108 is in the form of a touch screen computing or data processing device 200, as shown in FIG. 2, which may be a standard device or computer system such as a touch screen tablet, notebook, or desktop computer executing a standard operating system 202 such as a Microsoft Windows™, OS X™, iOS™, Android™, or Linux™ operating system, and the shared access processes described herein are implemented in the form of one or more ("shared access") software components 204 stored on non-volatile (e.g., solid-state or hard disk) storage 206 of or associated with the user device and executing on top of the operating system 202. However, it will be apparent to those skilled in the art that the shared access processes described herein can alternatively be implemented as integral parts of an operating system. It will be also be apparent to those skilled in the art that the shared access processes described herein could alternatively be implemented, either in part or in their entirety, in the form of one or more dedicated hardware components, such as application-specific integrated circuits (ASICs), and/or in the form of configuration data for configurable hardware components such as field programmable gate arrays (FPGAs), for example.

In the described embodiments, each user device 200 includes standard computer components, including random access memory (RAM) 207, at least one processor 208, and external interfaces 210, 212, 214, interconnected by at least one bus 216. The external interfaces include universal serial bus (USB) interfaces 210 (which in some embodiments may be connected to a keyboard 218 and pointing device such as a mouse), at least one (wired and/or wireless) network interface connector (NIC) 212 which connects each device 200 to the other user devices 200 via the wide-area network (WAN) 110, and typically also to local peripheral devices via a local area network (LAN) 220, which may include wired and/or wireless components. Typical peripheral devices may include alarm systems, document scanners, cameras, television tuners, home automation systems, and joysticks or other forms of input or output devices, particularly those suited to the elderly or handicapped.

Each user device 200 also includes a display adapter 214, which is connected to a display device 222 (which in the described embodiment is an integrated display mounted within a common housing with the other components of the user device 200, but in other embodiments may be separate therefrom) such as an LCD panel display, and an operating system 224 such as Linux™, iOS™, Android™, or Microsoft Windows™.

Alternatively, all of the software executed by the user device 200, including operating system layers, may be provided in the form of a 'software appliance' distributed on a computer-readable and bootable storage medium such as a USB key, a DVD-ROM, or a CD-ROM, for example. As such, the computer system hardware can be bootstrapped using the software appliance in order to automatically boot into an interactive user environment as described below without requiring any input from the user beyond simply powering up, turning on, or otherwise enabling the device 200 in preparation for use.

Alternatively, each entire user device 200, including its associated functional components (whether in the form of software and/or hardware) as described herein can be provided in the form of a complete "appliance", meaning that each user device 200 is manufactured and sold or otherwise provided as a complete, pre-configured unit that, when turned on, automatically generates the graphical user interface (GUI) and interactive user environment described herein and awaits user input, and intentionally does not provide (or allow) any other environment outside of the described interactive user environment.

Figure 3:
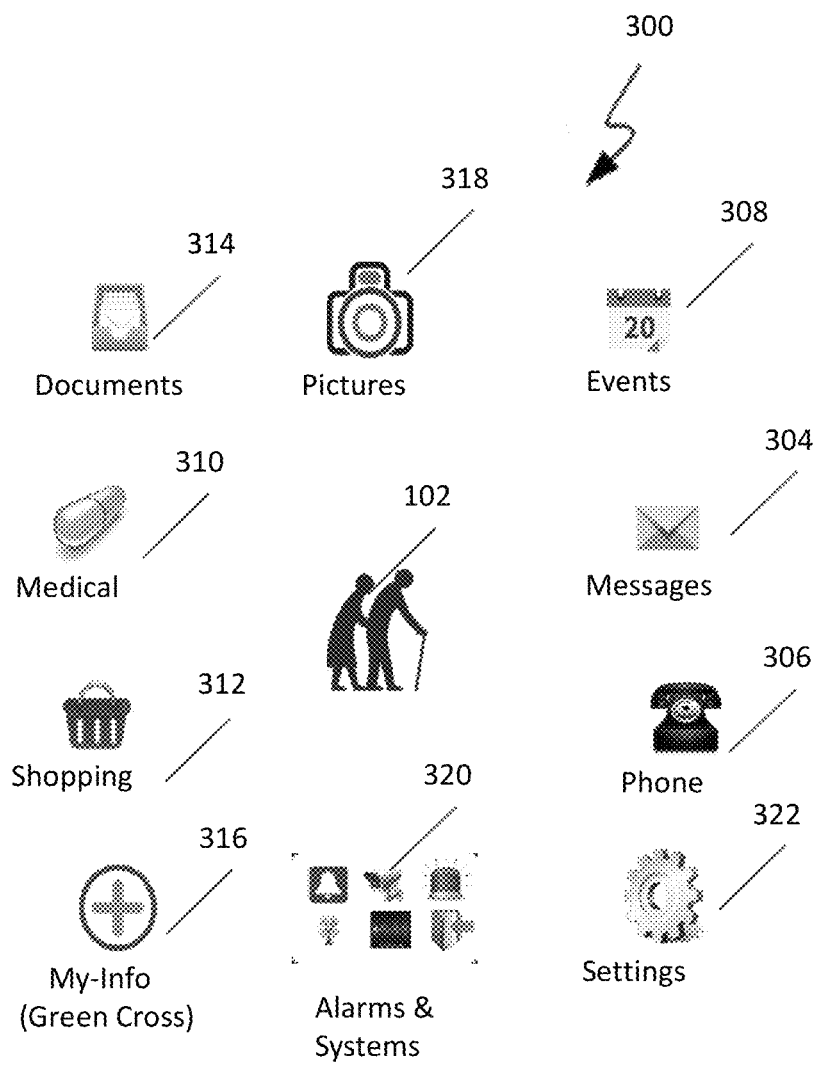
FIG. 3 is a schematic diagram illustrating one possible set of end-user functional components of the user device, in the form of end-user services/applications accessible via the user device.
Figure 4:
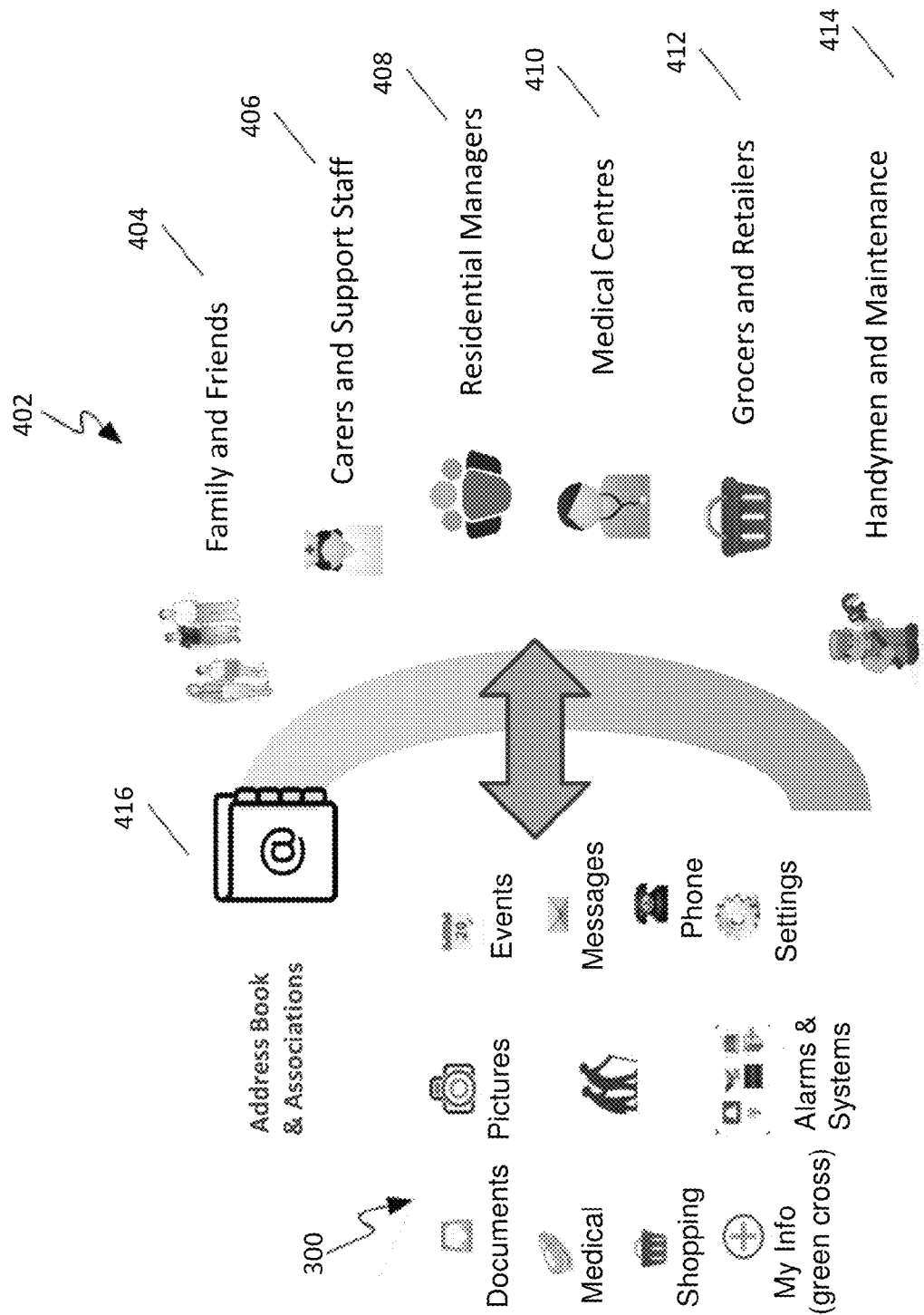
FIG. 4 is a schematic diagram illustrating the configurable remote access of the end-user services/applications of an end (first) user by a variety of other (second) users represented by their various roles/relationships/associations with the end user.

In the described embodiment, the set of end-user functional components in the form of end-user services/applications 300 that the system 100 provides to each end user 302 include those represented schematically in FIG. 3: namely, an address book/contacts service/application 302 that provides access to a shared and synchronised address book/contacts list for the users, a messages service/application 304, a phone service/application 306, a calendar events service/application 308, a medical and prescriptions service/application 310, a shopping service/application 312, a documents service/application 314, a Green Cross (also referred to as "My Info") service/application 316, pictures 318, and an alarms and systems service/application 320. In addition, a settings service/application 322 is provided to allow the end-user 302 to configure his or her user device 200, and in particular to independently configure which of the services/applications 300 can be remotely accessed by which of a plurality of remote second users 402, as shown in FIG. 4, and the extent of that access. In this specification, the term "service" is to be understood broadly as referring to an end-user functional component that typically provides a group or set of related end-user functions executed by each user device 200 and that can also be considered to constitute an "app" or "application" (e.g., within the generally understood meaning of "software application", regardless of whether those functions are actually implemented in software or hardware) or as a stand-alone application or otherwise. Thus in this specification the terms "service", "application", "app", and "function" can be regarded as interchangeable, except where the context indicates otherwise. In this sense, the "services" of the user devices 200 are analogous to applications or "apps" installed on a standard computer system or smart phone, for example.

Access to the end user's services/applications 300 can be provided to any given other (second) user based on a unique identifier of the second user, and/or a trusted relationship role (or 'association') defined for that second user. For example, as shown in FIG. 4, in the described embodiment, the relationship roles include family and friends 404, carers and support staff 406, residential managers 408, medical centres to 410, grocers and retailers to 412, and handymen and maintenance 414. However, it should be understood that other roles and/or relationships can be defined in other embodiments, as desired, either in addition to, or as alternatives to, those described herein. As described further below, the access provided to any given user or role 402 is defined by the end user's address book and corresponding user configurable access data 416.

Figure 5:
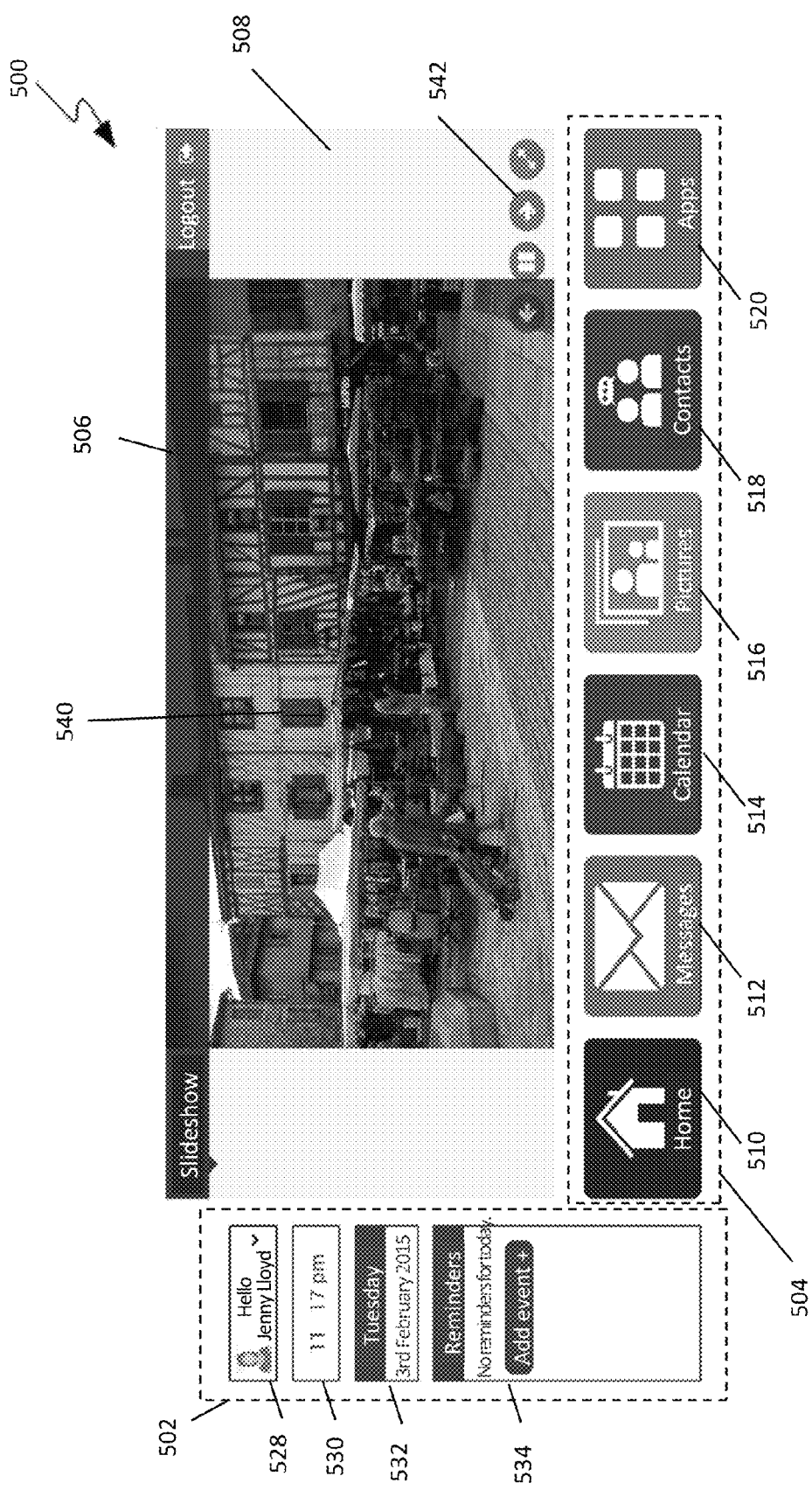
FIG. 5 is a screenshot of a 'home screen' graphical user interface (GUI) displayed on the screen of a user device in an embodiment using the set of end-user services/applications shown in FIG. 3.

The end user's address book and access data 416 can reside on the user's device 200 and can be laterally synchronised with other user devices 200 of the system 100 to provide a system-wide address book and an association reference data capability. In embodiments having a large number of networked user devices 200, the address book data and access data 416 of each user device 200 of the system 100 are copied to and synchronised with at least one domain level server 112 in order to form a Global Address Book (GADB) and a Global Associations reference book (GASS) that are used by all the users of the system 100 to communicate and, where they elect, to form dynamic associations between themselves. As shown in the screenshot of FIG. 5, the system displays to the user, on a display screen of the end user's device 102, a graphical user interface (GUI) in the form of an interactive 'dashboard'—type user environment. In the described embodiment, the GUI includes four distinct GUI portions or regions 502 to 508, namely a quasi-static region 502, a service/application selection region 504, and variable service-related regions 506, 508 consisting of a service/application GUI region 506, and a service controls region 508.

The quasi-static region 502 is so named herein because it nearly always displays the same information and controls, these being information and controls that should always be easily accessible to the end-user. In the described embodiments, these include, from top to bottom, a user context region 528, a time-clock button 530, a Date Indicator 532, and an events/calendar region 534.

The service selection region 504 displays a set of graphical icons/controls 510 to 520 representing and providing easy access to the corresponding five (in this embodiment) most frequently used services and settings (or to applications providing those services and settings) of those defined for the system 100 (in the described embodiment, being the set of services 300 shown in FIG. 3).

In the described embodiment, the display screen is a touchscreen, allowing the end user to select or otherwise interact with a desired service by touching the corresponding control displayed as a corresponding graphical icon and/or image in the service selection region 504. In other embodiments without a touchscreen, a standard pointing device such as a mouse or track-pad can alternatively be used.

For example, in the screenshot of FIG. 5, the icons/controls 510 to 520 displayed from left to right along the service selection region 504 include a home icon/control 510, a messaging icon/control 512, a pictures icon/control 514, a calendar events icon/control 516, a contacts management icon/control 518, and an applications icon/control 520. The applications icon/control 520 provides access to the complete range of services/applications provided by the system 100, each of these being selectable by a user in order to access and activate the corresponding service/application.

Thus when a user selects one of the service icons/controls 512 to 520, a corresponding GUI of the selected service/application is displayed in the application/service region 506, and (in most but not all cases) icons/controls of the selected service/application are displayed in the service controls region 508 of the GUI 500. The currently selected service/application or 'mode' of the device is also indicated by shading the corresponding icon/control that had been selected by the user in the service selection region 504.

For example, the screenshot of FIG. 5 shows the GUI in its 'home screen' mode of operation, as indicated by the shaded home icon/control 510. This is the default mode or screen of the GUI that is displayed when a user device 200 is initialised. In this mode, the application/service region 506 displays a slideshow 540 of changing images selected by the device owner (the 'first user') using a pictures service/application accessed by selecting the pictures icon/control 516. In this mode, the service controls region 508 displays controls 542 for the slide show 540, including a pause/play control, forward and back controls, and a normal/wide aspect ratio screen display mode toggle control.

Figure 6:
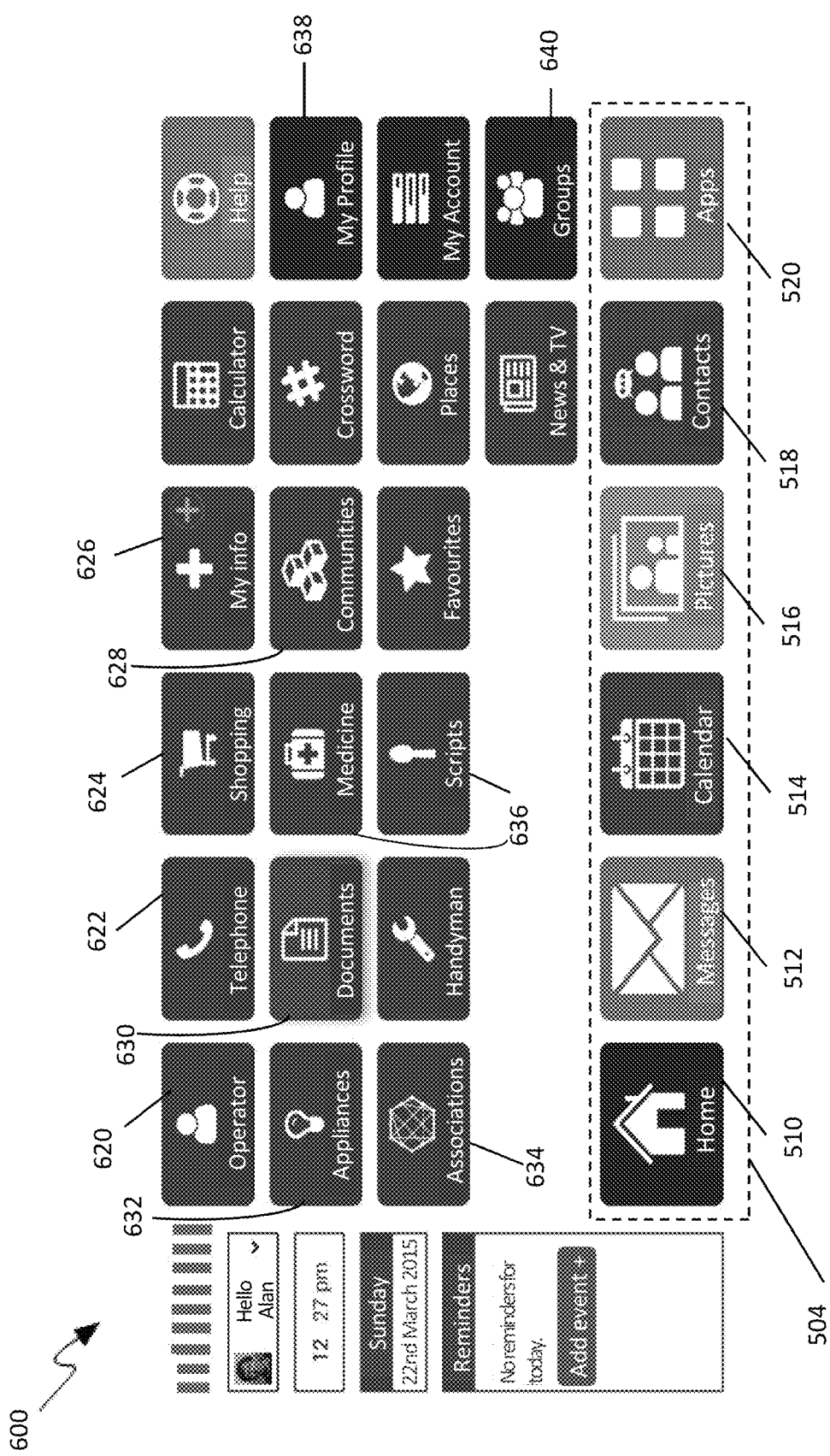
FIG. 6 is a screenshot of an application selection screen GUI displaying the user services/applications shown in FIG. 3.

When the applications icon/control 520 is selected by a user, a two-dimensional array or grid of other icons/controls representing all of the other respective end-user services/applications configured for the system 100 is displayed in the application/service region 506, as shown in FIG. 6, to allow the user to access any of those services/applications. (The icons/controls 510 to 518 remain displayed in the service/application selection region 504 to provide access to the most frequently used services/applications.) In the described embodiment, the other icons/controls include a phone service icon/control 622, a shopping service icon/control 624, a "My-Info" (green cross service) icon/control 626, a documents service icon/control 6630, an appliances service icon/control 632, an associations management service icon/control 634, and medicines and script management service icon/controls 636. The "Apps" icon/control also provides access to group and community services, a user profile settings service, and access to a residential manager/operator, via respective icons 640, 628, 638, 620.

Figure 7:
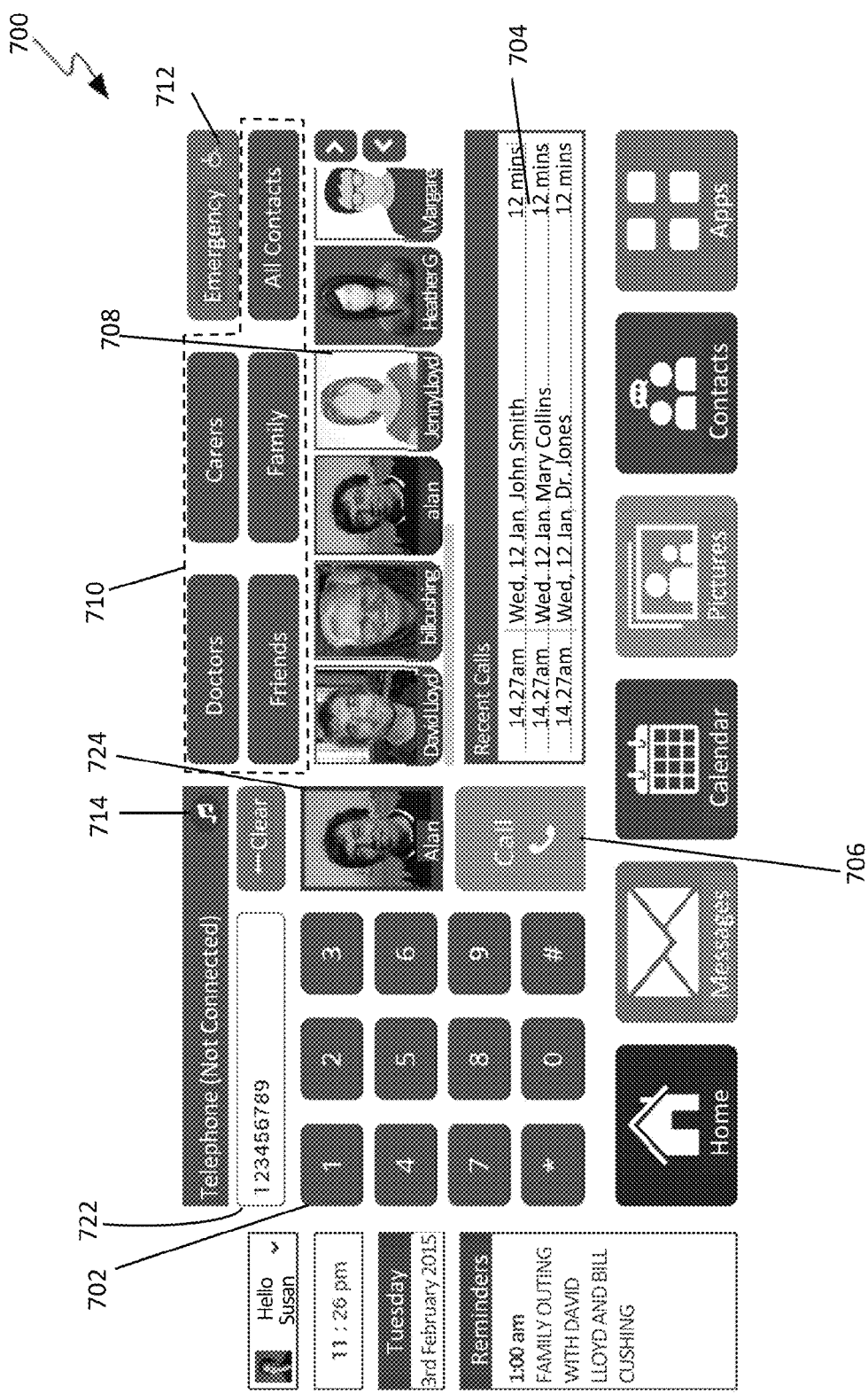
FIG. 7 is a screenshot of a GUI of a telephone service/application of the end-user services/applications shown in FIG. 3.

Thus, for example, the phone icon/control 622, when selected, provides the user with access to the end-user's (e.g., PSTN/ISDN) telephone and corresponding address book by displaying phone service GUI components 702 to 710 in the application/service region 506, and phone service icons/controls 712 to 720 in the service controls region 508, as shown in FIG. 7.

The phone service GUI components 702 to 710 include a phone dialing panel 702, a call history log 704, a call/call disconnect 706, an image based address book selector 708 for doctors, carers and friends (which is common in terms of look and feel and management to many of the other services/applications, such as messaging and calendar and image and document sharing), and address book filter buttons 710. The address book filter buttons 710 allow the user to easily filter which entries in the address book are displayed in the selector 708. For example, in the described embodiment, the address book entries can be filtered by the role categories of "doctors", "carers", "friends", and "family", so that, when one of these buttons is selected by a user, only address book entries matching the selected role are displayed to simplify the selection of a desired person by the user. Each matching address book entry is displayed in the form of a photographic image (where available) of the corresponding user, with the user's real name written in a solid coloured bar at the bottom of the image. When a desired entry of the address book is selected by touching the corresponding image displayed in the address book selector 708, the selected entry and telephone number are displayed in a caller display region 724 and phone pad number display 722, respectively.

The phone service icons/controls 712 to 720 displayed in the service controls regions 506 and 508 include a speed dial emergency call button 712 and a ring tone selection control 714. The call history display area 704 can be expanded to show the full call history log. Returning to FIG. 6, the other icons/controls displayed in the service selection region 504 can be similarly selected by the end-user to access respective other services/applications for email messaging, shopping, prescriptions, displaying images, viewing and sorting documents, calendars, television, news, and Green Cross ("My Info") information.

Figure 8:
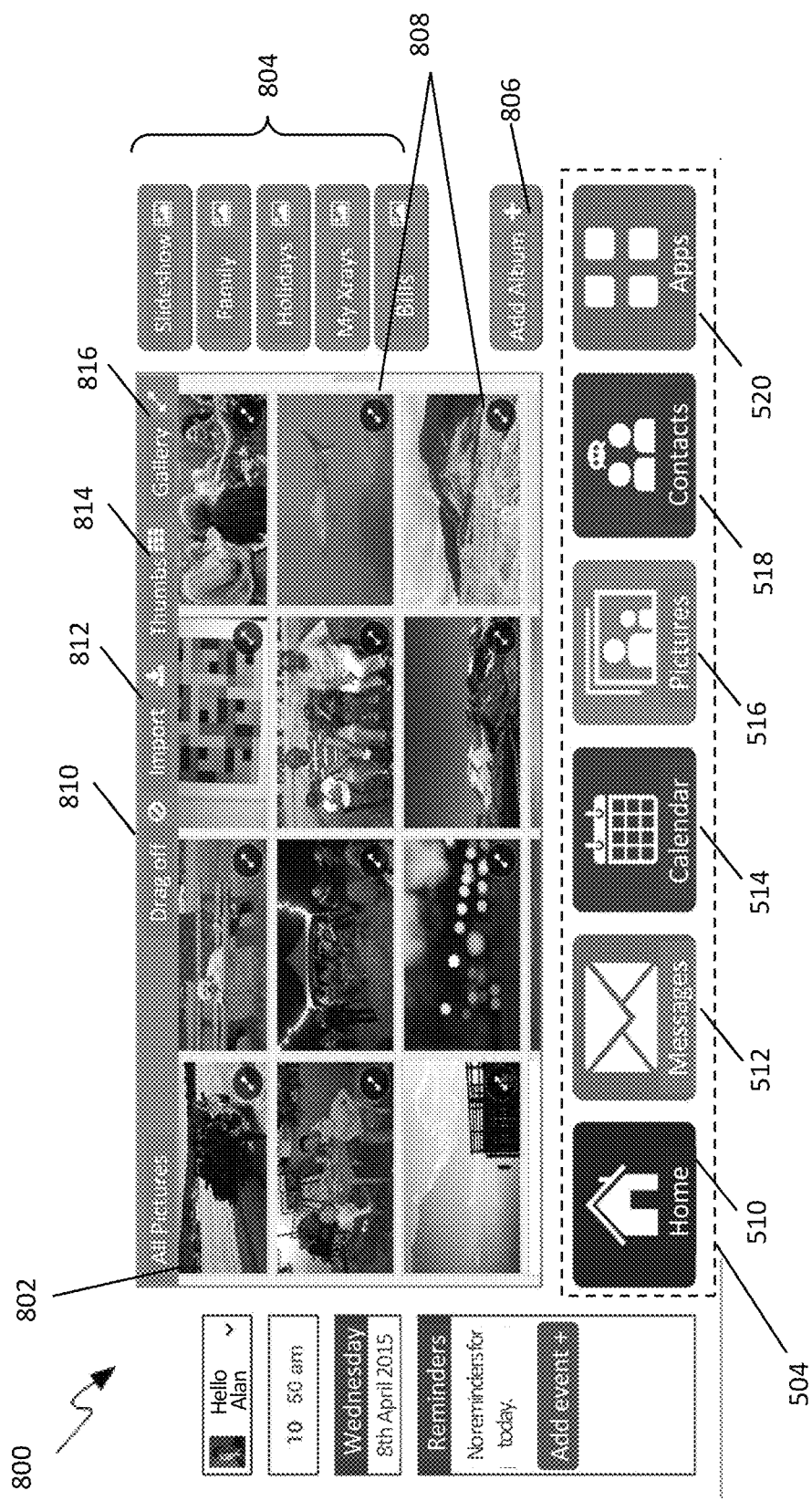
FIG. 8 is a screenshot of the main screen GUI of an image management service/application of the end-user services/applications shown in FIG. 3.

As a further example, FIG. 8 is a screenshot showing the GUI displayed on a user device 200 when the pictures service/application has been activated by the user selecting the pictures icon/control 516.

In the resulting image service mode of operation, the service GUI region 506 includes an image selector panel 802 that displays a two-dimensional array or grid of images uploaded to the user device 200 by the user, and image album selection controls 804 for displaying respective sets of user images in the image selector panel 802. The image album selection controls 804 are created by the user selecting an "Add Album" control 806 and entering the name of the newly created album. Images are added to an album by dragging and dropping them onto the corresponding album control.

Images placed in albums are tagged with metadata indicating the name of any albums that the image belongs to.

Figure 9:
FIG. 9 is a screenshot of an image gallery GUI of the image management service/application.

Displayed above the image selector panel 802 are upload and picture view mode controls 810 to 816 that allow the user to toggle whether images can be removed from the displayed album by simply dragging them off the image selector panel 802 (control 810), to import files/images 812, and to change how images are displayed and managed, including selection of the picture display mode as either thumbnail mode 814 or gallery mode 816. In addition, each displayed image includes a gallery view control 808 in a corner of the image to allow the user to see the corresponding image in an enlarged form. Specifically, when the user selects the gallery view control 808 of a displayed image, the service selection icons 510 to 520 in the service selection region 504 are hidden, and replaced with an enlarged version of a gallery slider 904 showing the images as previously displayed in 802, and with the selected image in an enlarged form, as shown in FIG. 9. The gallery slider 904 allows a different image to be selected for enlarged viewing 904. Picture management icon/controls 906 to 920 are displayed in the service controls region 504, including icon/controls for sharing the selected image with other users 906, rotating the selected image 908, adding a caption 910, tagging the selected image to a folder/album 912, cropping the selected image to include part of it as the user's profile picture 914, and deleting the selected image 916. The other buttons allow the user to select the display of Thumbnail views of the images 918, or to return to the pictures home page 920.

Figure 10:
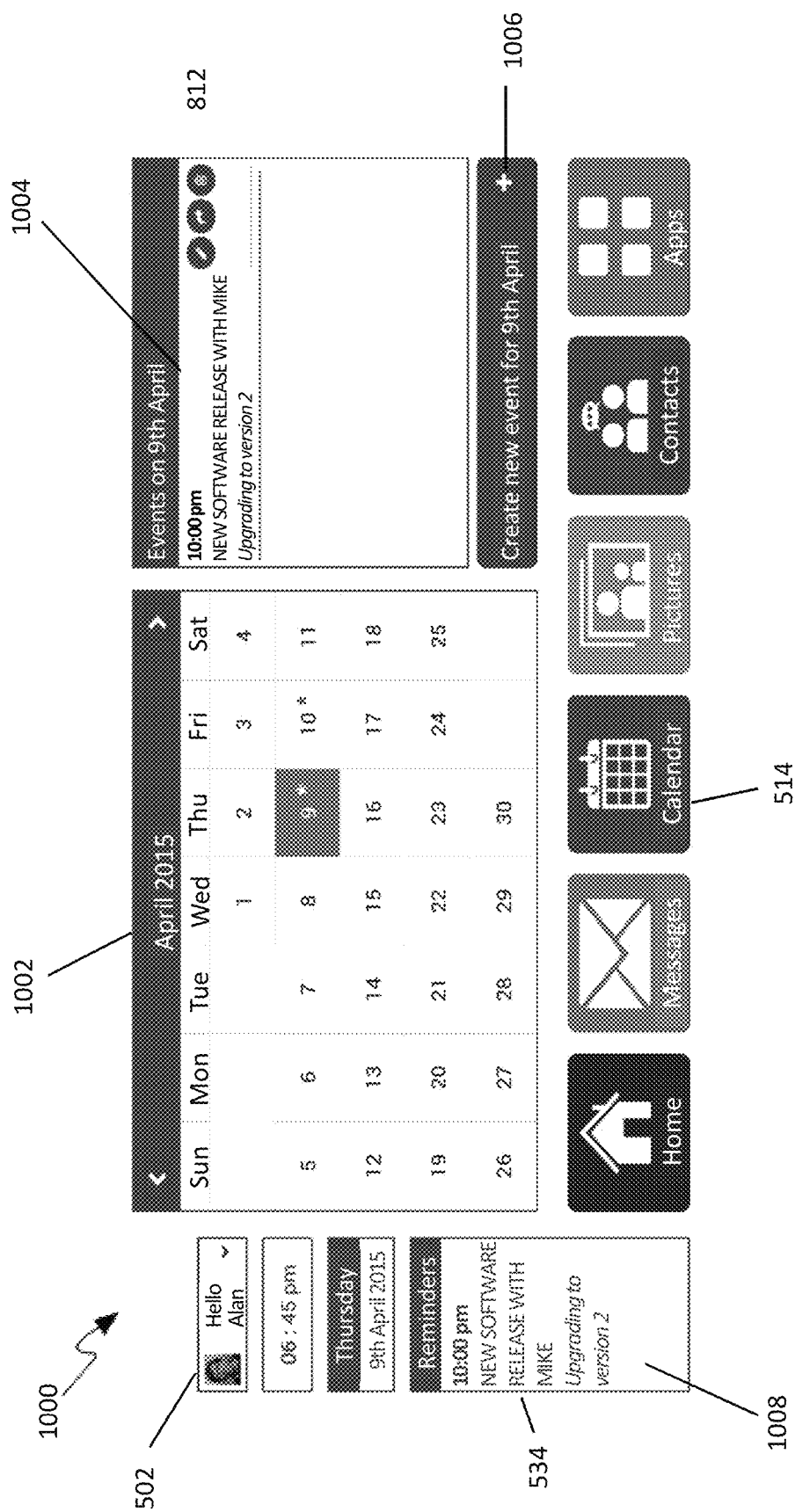
FIG. 10 is a screenshot of a GUI of a calendar and events management service/application of the end-user services/applications shown in FIG. 3.

As yet a further example, FIG. 10 is a screenshot showing the GUI displayed on a user device when the calendar/events service/application has been activated by the user selecting the calendar icon/control 516 of the service selection region 504.

In the resulting calendar service mode of operation, the service GUI region 506 includes a year-month-day selector panel 1002, and an event display panel 1004, the latter including buttons to edit, share or delete a selected event. A create event button 1006 when selected allows the user to create a new event and enter details of the event, including a description of the event and to invite other users. Details of events of the current day 1008 are displayed in the events/calendar region 534.

Green Cross is an international home care initiative which prescribes that basic medical information on a provided form is kept inside a marked plastic bottle which is then stored in a well-known place (inside a fridge), and Green Cross stickers are placed inside the users front door and on the fridge door. The aim of the Green Cross initiative is that, in the case of an emergency, paramedics or carers can easily find and use such information.

In addition to this standard Green Cross textual information set, selection of the Green Cross ("My Info") icon/control 626 activates a Green Cross service/application that not only provides an alternative way to access the end user's Green Cross information, but moreover allows additional or enhanced Green Cross information to be easily captured from scanned documents using the document service accessible via the "Documents" icon/control 630 or camera images (imported via a peripheral imaging device and the "Appliances" services). Additionally, some types of information are automatically determined and stored for access via the Green Cross service/application, including the user's recent calendar events and telephone numbers, thus providing enhanced and up-to-date information. These types of information can be important for an emergency crew, for example, attending the user in response to a medical emergency. Information on the user's pet(s) (and vet) is also included, as many users form strong relationships with their pets, and uncertainty as to the care or health of their pet can be a significant source of anxiety for many users, if hospitalised or put into a care facility, for example. Any users categorised as doctors, carers, pharmacists, etc are automatically shown as such in the Green Cross service/application, and medications and associated dosages are also listed.

Moreover, the system 100 allows this Green Cross information to be shared with those that need to see it, as described below. For example, a precinct manager in an aged care facility or a carer can see and manage Green Cross information summaries for resident user groups according to the association data defined for the members of each resident group and the precinct manager/carer.

Moreover, with wide adoption of the system 100 across the community, an end-user's device 200 can supplement or even replace the plastic bottle and paper form within the end-user's refrigerator as being the standard location of Green Cross information.

Thus it will be apparent from the above description that the device 200 provides an intuitive, easy to use user interface to a variety of different services/applications relevant to an aged or otherwise disabled end-user. To the extent described thus far, some of the functions provided by each of the individual end-user services/applications of the system 100 to the end-user may be similar to those provided by prior art computer applications known to those skilled in the art. To this extent, the device 200 can be completely self-contained, in the sense that, except for services that require retrieval of remotely stored information (e.g., the news service) or access to a network to peripheral device (e.g., a printer/scanner or television or media streaming device accessible only via the end-user's LAN 220), the other services and information are all stored and processed locally within the user device 200, and thus are fully functional, irrespective of whether the device 200 is connected to any communications network.

However, in addition to providing the features and advantages described above, embodiments of the present invention provide a unique ability to selectively provide remote access and assistance to the end-user via the system 100 by allowing one or more selected remote users of other devices 200 of the system 100 individually configurable remote access to individual selected services/applications of the end-user and their associated content of the end-user. In broad terms, this remote access can be thought of as similar to the forms of screen sharing or remote desktop access that are currently available to users of computer systems, such as VNC and Microsoft Remote Desktop Access, for example. However, such applications provide all or nothing access to the entire computer or device to which the remote access is given, and that access being provided based on username/password authentication.

However, embodiments of the present invention allow the unique ability to provide individually configurable levels of remote access to the end-user's services/applications of their device 200, on a per user (and/or per relationship/association with the end-user) and a per service/application basis. For example, the system 100 can be easily configured to allow a desired level of access to any selected service/application independently of any other server/application, and to any selected user or type of user (that type being defined in terms of that user's relationship or 'association' with the end-user). Thus this system allows an end user to completely control the type of access of any selected user or to any selected type of user to any selected service/application of the end-user's device 200.

In the context of the described embodiment where the trusted remote users provide assistance to an aged or handicapped end-user, the remote users typically perform actions within one or more selected services/applications of the end-user on behalf of the end-user, and/or completely manage those services, as appropriate to each user's relationship to the end-user, and as determined by the level of access to those services provided to each remote user.

For example, referring back to FIGS. 3 and 4, the system 100 can be easily and dynamically configured to allow access to the end-user's shopping service/application 312 to any other user of the system 100 who is associated with the end-user 302 as being in the category Family and Friends 404 relative to the end-user 302. Similarly, any users in the Carers and Support Staff category 406 can be provided access to the end-user's Medical service/application 310 and Green Cross service/application 316. In the context of the end-user being a resident of a care facility, Residential Managers 408 of the facility can be provided access to the end user's Alarms and Systems service 320.

Returning to FIG. 1, where a second user 104 is allowed any form of access to the user device of the end user 102, the second user 104 is able to select the end-user 102 from a list of users of the system 100 displayed on the second user's device, and thus access the end-user's user device. In this remote access mode, the second user's device displays the end user's GUI such as that shown in FIG. 5, except that the icons/controls of any of the end user's services/applications to which the second user does not have access are disabled (as indicated by being displayed in a 'greyed out' or shaded form) to prevent the second user from accessing those services/applications. Conversely, any of the end user's services/applications to which the second user has full access are displayed on the second user's device in the same manner as they would be displayed on the end-user's device, providing full access to all of the corresponding functions of those services/applications of the end user, including the associated content of the end-user, and displayed in a manner analogous to a conventional screen sharing display.

The integrated address book and its user-centric approach to displaying the family/friends, carers and doctors of the end user is an important component of the system 100, and in respect of which a user's trusted associations are configured by the end-user themselves (or their family, etc, but using the end-user's device), such associations being aligned with the services/applications provided by the end user's device/appliance 200.

Figure 11:
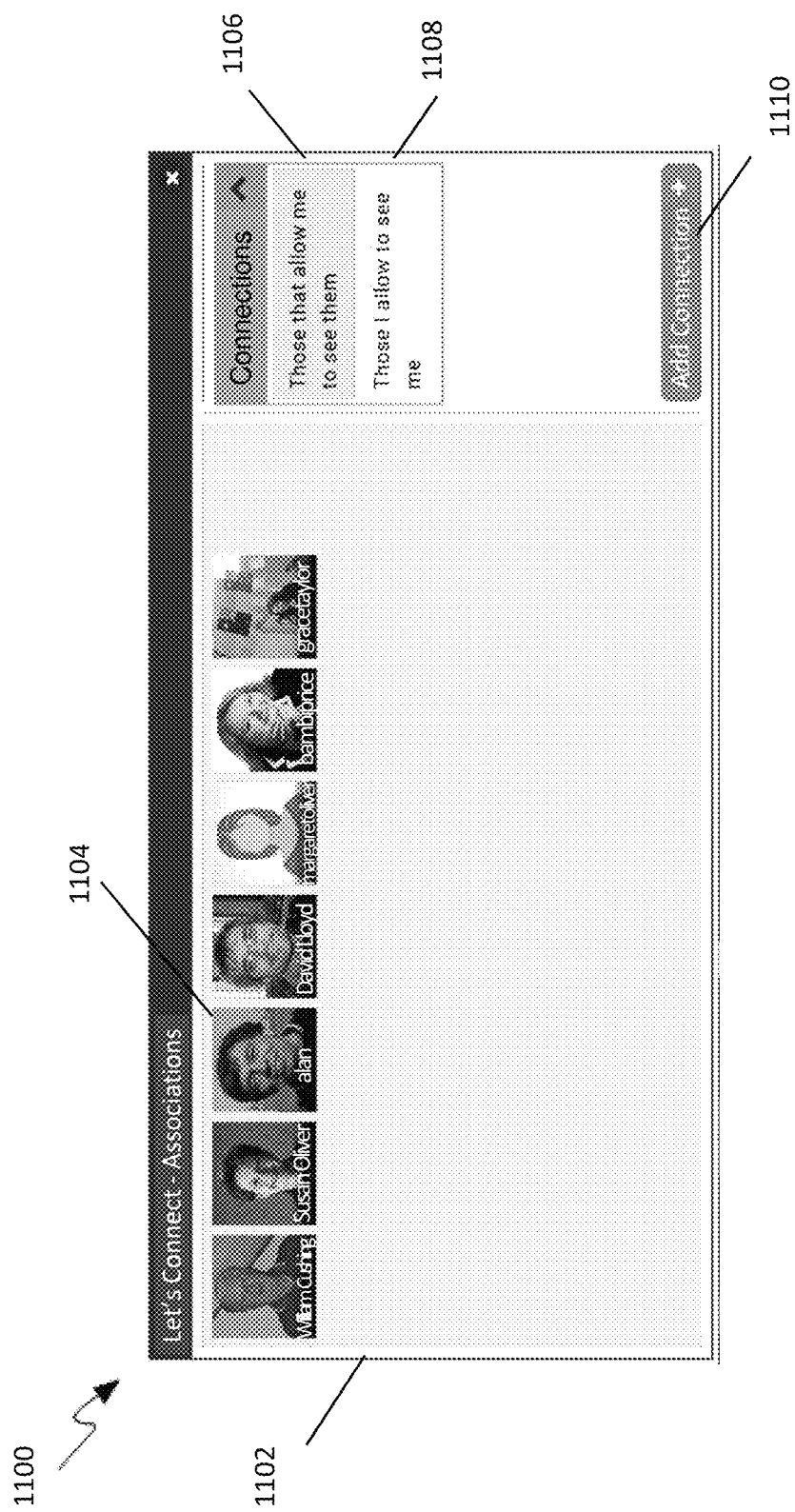
FIG. 11 is a screenshot of an Associated Users GUI of the system that allows a user to at least partially switch the user environment of their user device to the environment of another user's device, and/or to configure access of one or more other users to one or more services/applications of the user's own user environment.

As noted above, the level of each type of access can be individually controlled on a per service and per user basis using an Associated Users window 1100, as shown in FIG. 11, and which is generated by a user device 200 in response to a user selecting the Associations icon/control 634.

The Associated Users window 1100 includes an associated user listing panel 1102 allows the selection of another user by this user selecting a corresponding image of the other user 1104. A view selector section displays controls 1106, 1108, that, when selected by this user, results in the listing area 1102 displaying: (i) those other users who have allowed the interactive user environments of their respective user devices 200 to be viewed by this user 1106; and (ii) those other users that this user has allowed to see this user's interactive user environment.

An Add Association icon/button 1110, when selected, causes the display of the user's address book/contact list from which a second user with no existing defined access associations can be selected 1110. This allows the first user to define one or more associations with the selected second user in order to allow access to one or more of the first user's respective services/applications, as described above.

Figure 12:
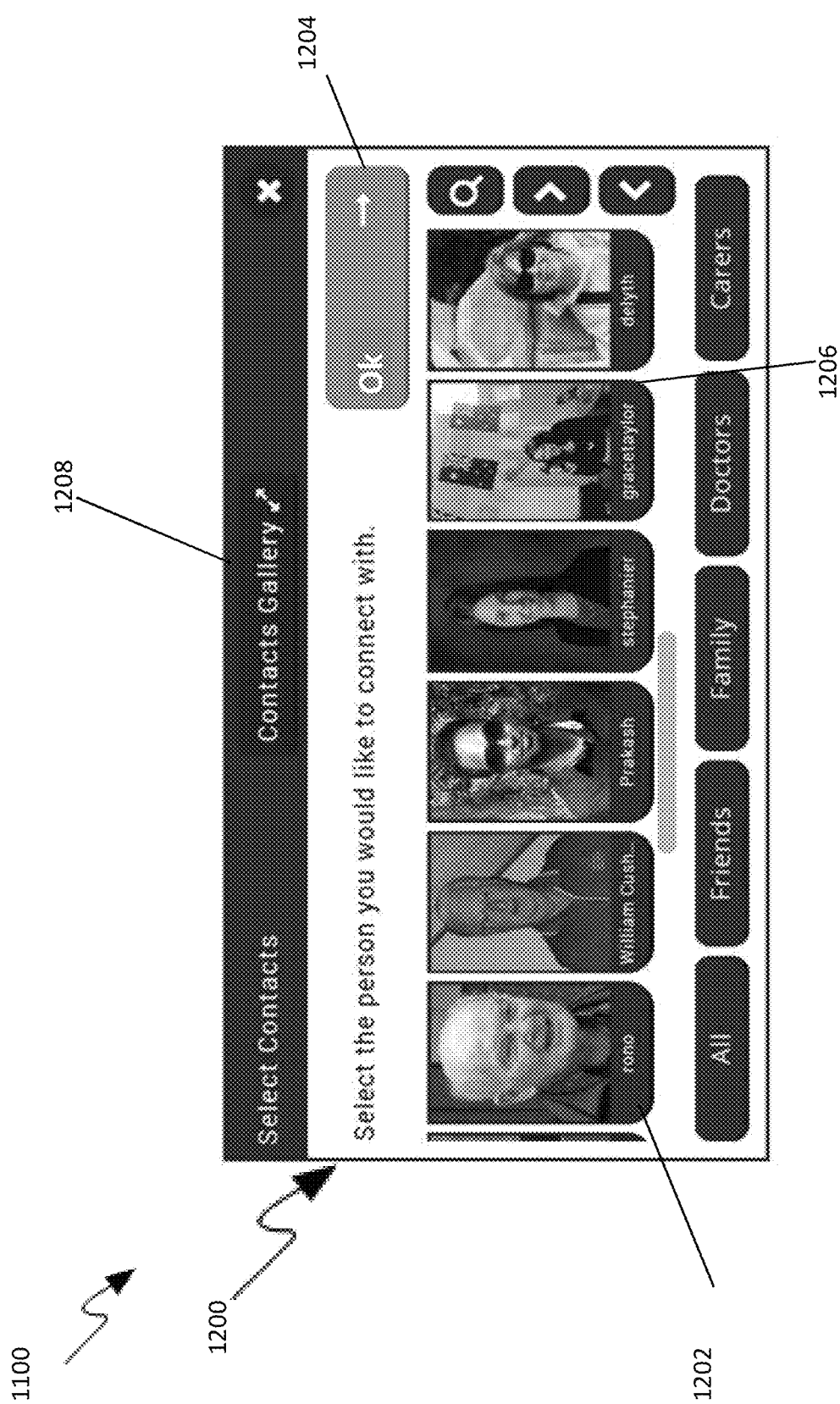
FIG. 12 is a screenshot of an image-based user selector that enables a first user to select a second user from the users in the first user's address book so that the selected second user can then be configured for access to one or more functional components of the first user's environment of the first user's user device.

As shown in FIG. 12, the first user's address book/contact list is displayed in an address book selector window 1200 overlaid on the (greyed out) Associated Users window 1100. The address book selector window 1200 includes an address book slider that allows the first user to select an image 1202 of a second user, and then select an "OK" icon/control 1204 to continue on to define one or more associations with the first user's services/applications. The user listing part 1206 of the window 1200 provides an array of images and names of the registered users of the system 100 as assigned by the first user to their own address book, Users can also be selected via the address book gallery icon/control 1208, which, when selected by the user, causes the user device 200 to execute the Contacts service that can alternatively be launched by selecting the Contacts icon/control 518 in the service/application selection region 504.

Figure 13:
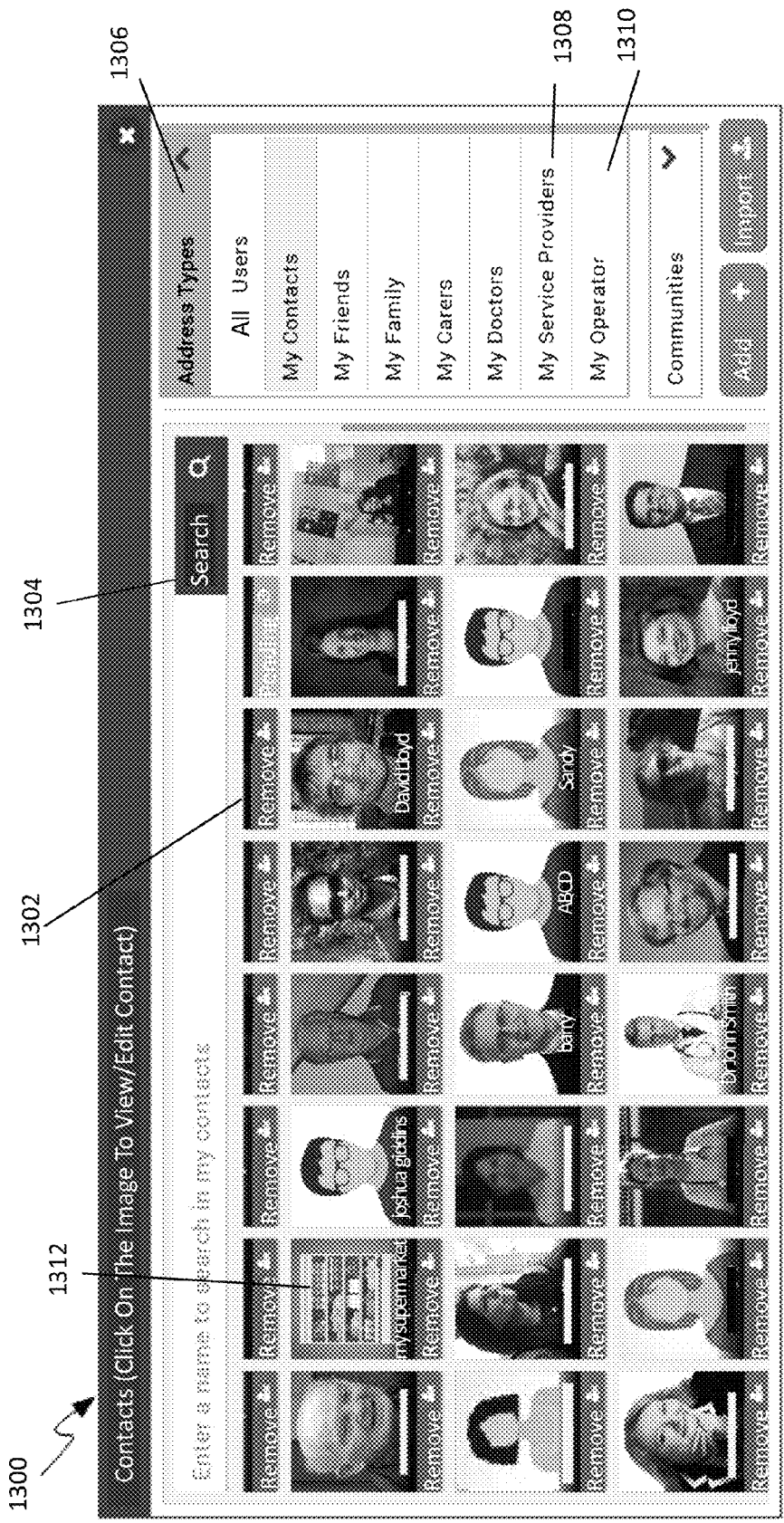
FIG. 13 is a screenshot of the image based user selector of FIG. 12 in a gallery display mode.

As shown in FIG. 13, the Contacts service/application generates a contacts gallery window 1300, which displays a user gallery 1302 in the form of a scrollable two-dimensional array or grid of images of respective users of the system 100, each image being displayed together with the name of the corresponding user and a control that, when selected, removes the corresponding user from the user's address book. The contacts gallery window 1300 also provides the ability to select a user by clicking their image to view or modify the selected user's details (including their email address, user type (i.e., the relationship/association/role relative to the end-user, and contact information), search for a named user 1304, or select users by their relationship to the first user.

For example, a user filter panel 1306 provides a set of filter controls that allow the first user to filter the second users that are displayed in the array. For example, when the user selects a Service Providers control 1308, only users who have been designated as grocers, handymen, vets, pharmacists and lawyers (in terms of their relationship or association with the first user) are displayed in the user gallery 1302. Similarly, selection of an Operator control 1310 causes only those who are designated as retirement village managers or have similar roles to be displayed in the user gallery 1302. The contact service also allows for non-human entities to be used as contacts. For example, a supermarket user 1312 is included in the users shown in the gallery 1302 of FIG. 13.

In some embodiments, a user can also be configured as a primary or secondary user during their registration with the system 100. Typically, the majority of users (and, by definition, all end users) are 'primary' users, as a secondary user will not have any system content (image or document) management resources. In the context of the described embodiments, secondary users only use the system 100 to assist primary users. Secondary users, through defined associations with other users, can access those other users' services/applications and content resources of those services/applications. In FIG. 13, the listed users are of type or role: Family, Friends, Doctors, Carers and professional Service Providers (such as handymen, vets, pharmacists, grocers, bank managers and lawyers).

Figure 14:
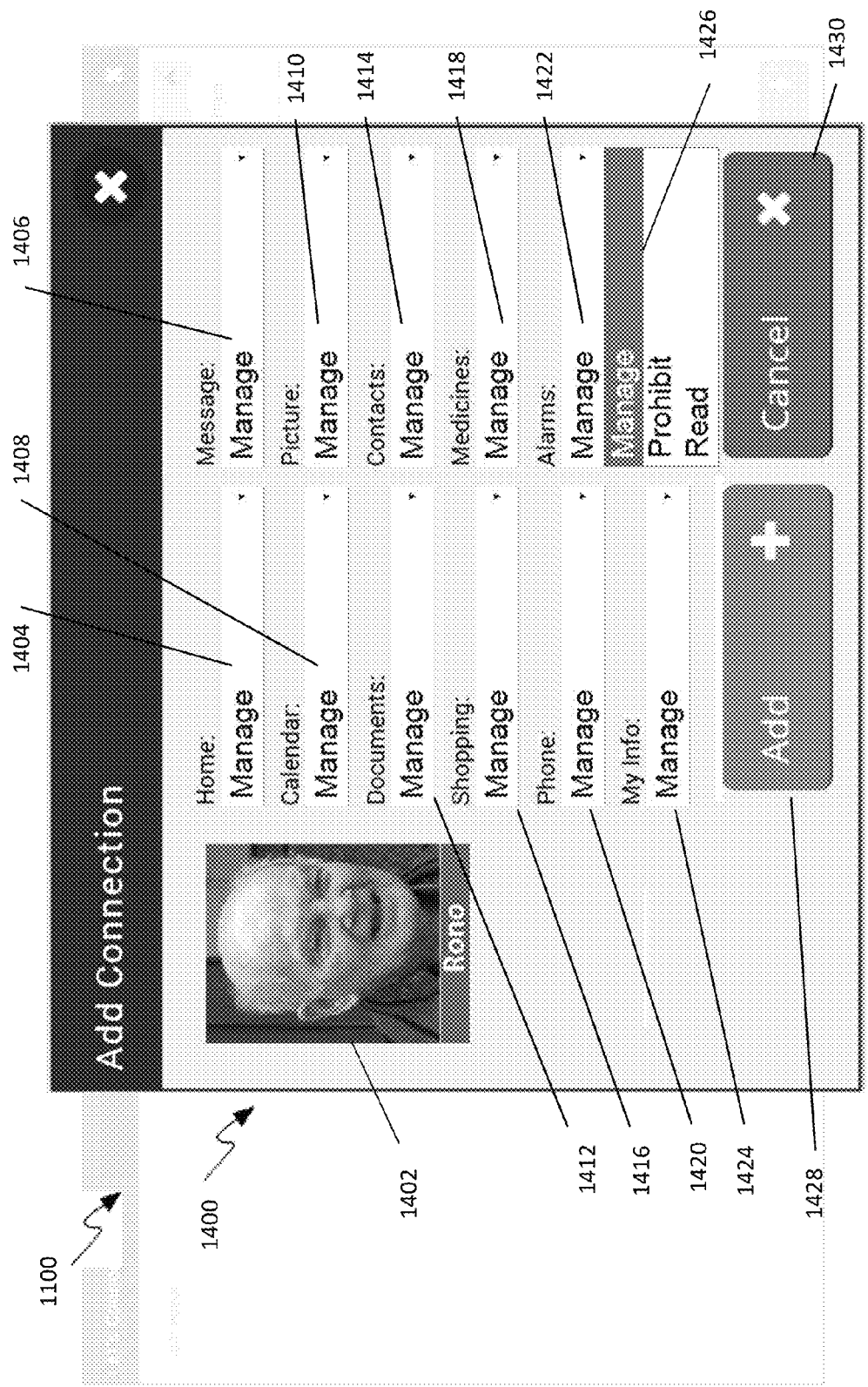
FIG. 14 is a screenshot of an Association management window that allows a first user to view or amend the access privileges of a selected (second) user with respect to respective services/applications of the first user.

Associations between the first user and another user of the system 100 can be reviewed and/or configured by the first user by way of an association management window 1400, as shown in FIG. 14, which is also overlaid on the Associated Users window 1100. The association management window 1400 displays an image 1402 of the selected other user, and a set of controls in the form of pull-down menus 1404 to 1424 that allow the end user to independently define the selected user's level of access to each of the end user's services/applications 300, by way of the pull-down menu for the home page 1404, messaging 1406, calendar 1408, pictures 1410, documents 1412, contacts 1414, shopping 1416, medicines 1418, the telephone 1420, alarms 1422 and My Info (green cross information) 1424.

In the described embodiment, the pull-down menus 1404 to 1424 allow the selected second user's level of access to each of the first user's services/applications 300 to be selected as one of "Prohibit" and "Manage" by selecting the corresponding entry 1426 from the corresponding pull-down menu. In some embodiments, the levels of access also include a "Read" level of access.

The "Prohibit" access level prevents any form of access to the corresponding service, the "Manage" access level provides full access to the service/application, and the "Read" access level allows the selected second user to view the corresponding service/application, but not to change any of its settings or content.

Once a given second user's service/application access permissions have been defined, they can be saved and brought into immediate effect by selecting the "Add" icon/ control 1428, or discarded by selecting a "Cancel" via the control 1430.

The service/application access settings configured for other (second) users using the Association management window 1400 are referred to collectively herein as the end (or first) user's 'access data', but also, because those settings are always defined relative to a corresponding end user (and the end-user's device 200), these settings are also referred to herein as the end user's 'associations' with other users, or simply as 'association data'. In this sense, the end-user is said to be the 'owner' of those associations or association data.

Once a given second user's service/application access permissions have been defined and saved as described above, that second user, using their own user device 200, can then immediately access any of the first user's services/ applications 300 to which the second user has been allowed access. Where the second user has been provided the "manage" level of access to a service/application, they have full control of that service/application to the same extent as the first user.

In order for a (second) user of the system 100 to access one or more services/applications of another (first) user, the second user navigates to the Associated Users window 1100 using their own user device 200, as described above. After selecting, if necessary, the connections control 1106 so that the associated user listing panel 1102 displays those (first) users who have configured their respective user devices 200 to allow the second user to access at least one of the first user's applications/services, the first user selects the image of the particular first user whose services/applications the second user wishes to access. Selecting one of those users in the Associated Users window 1100 activates a Switch User Context function (refer components 1710 and 1806 of FIGS. 17 and 18) that switches the current user context of the second users device 200 to be that of the selected first user.

In accordance with the user data displayed in FIG. 11, in this example the second user selects the image 1104 of a first user named "Alan", and in response the second user's device 200 on which this window 1000 is being displayed changes its user context to remote (first) user Alan's context, to the extent allowed by the access permissions defined on first user Alan's device 200 as described above for the current second user's access to user Alan's services/applications.

Figure 15:
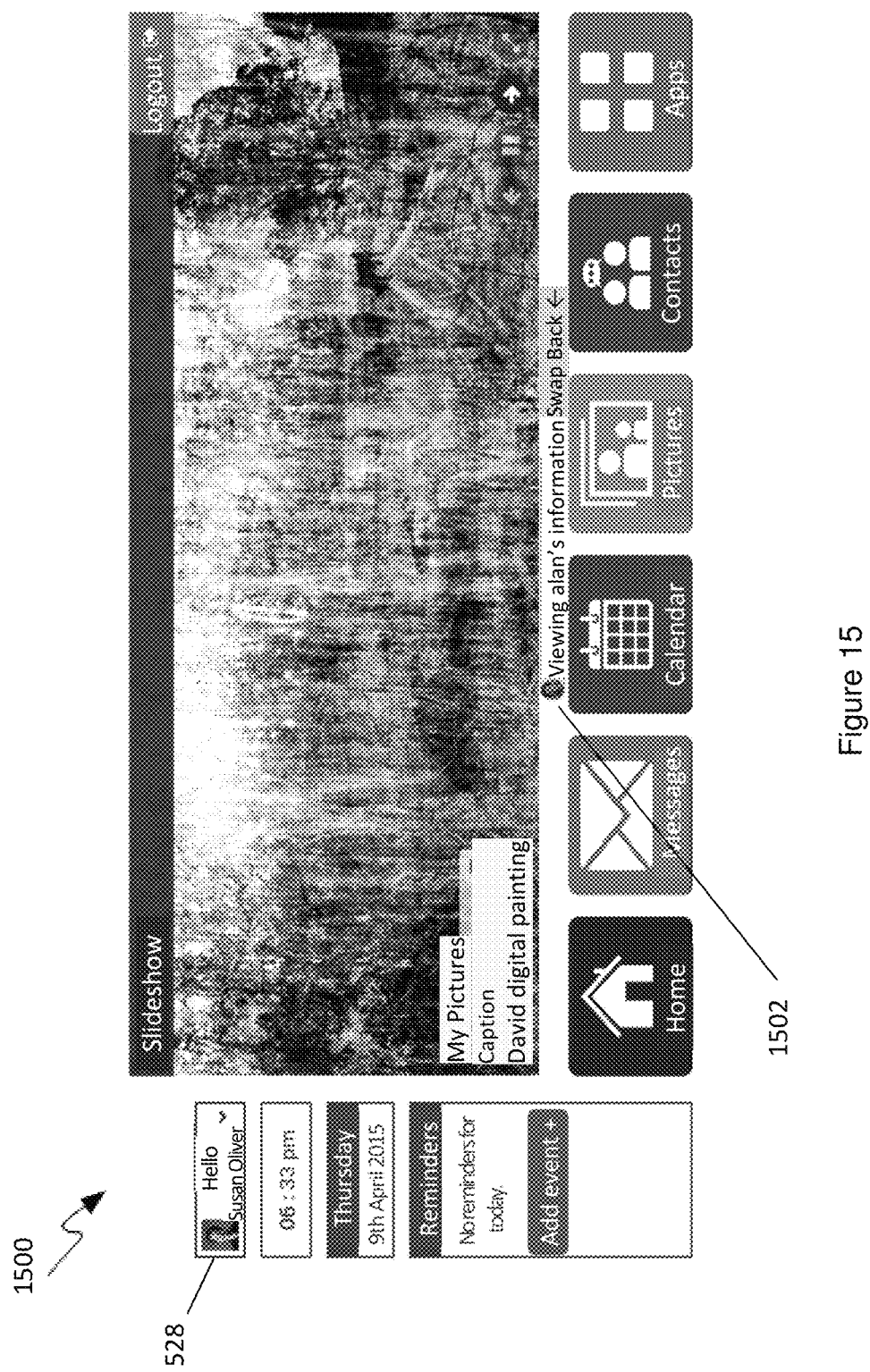
FIG. 15 is a screenshot showing a first user's home page as displayed to a remote second user, including identification of the first user and a context return button.

For example, upon a second user Susan activating this user context change to first user Alan's environment, Susan's device 100 then displays Alan's Home screen GUI, as shown in FIG. 15, but with an additional remote access indicator 1502 near the lower centre of the window 1500 under the slide show image 540 to identify that the session has been switched, and with user Susan's name and image remaining displayed 528 in the user display region 502.

Figure 16:
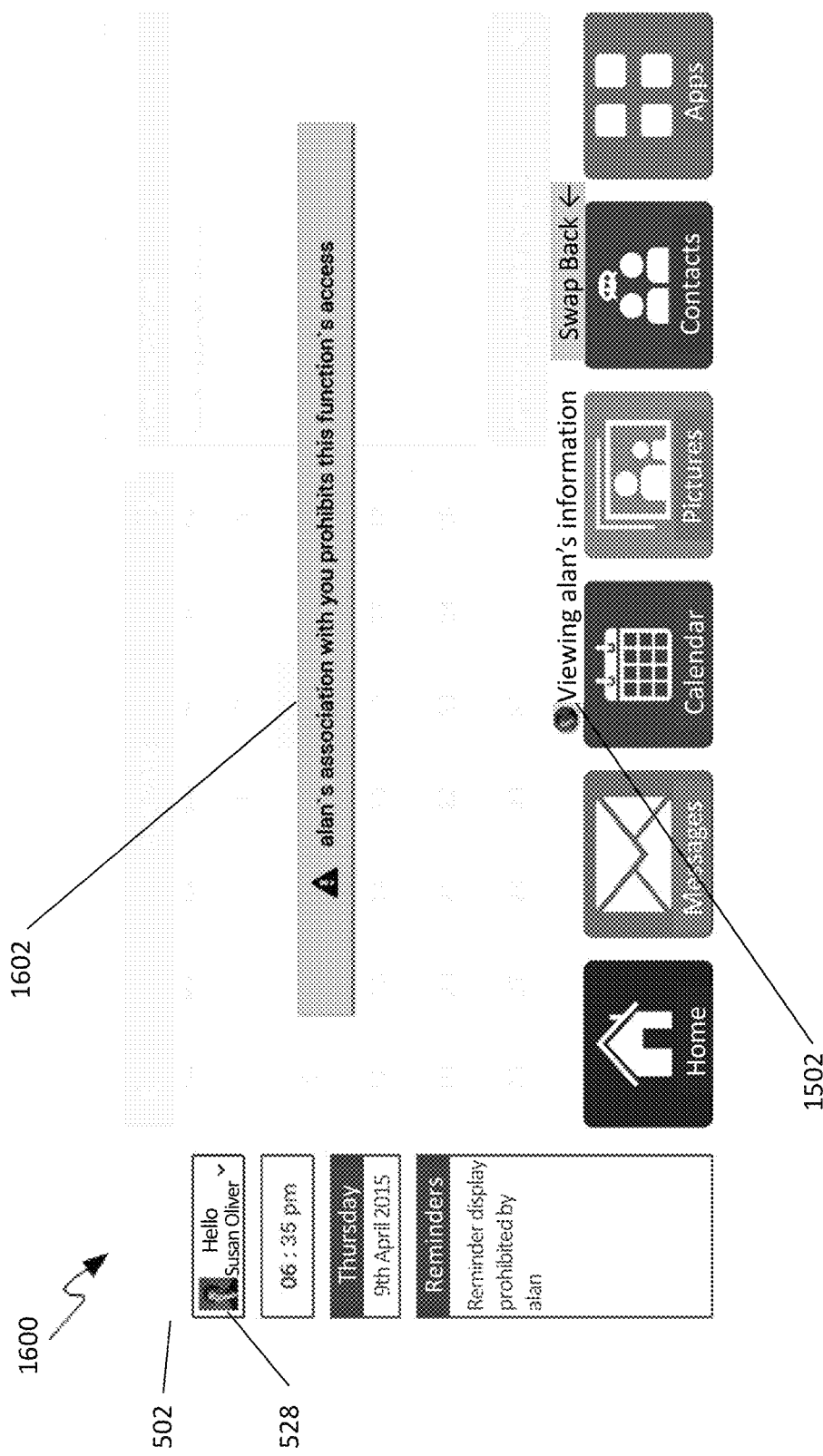
FIG. 16 is a screenshot of the screen displayed on a second user's user device after attempting to access the calendar/event service/application of a first user who has not allowed the second user access to that particular service/application.

FIG. 16 is a screen shot of the second user Susan accessing first user Alan's calendar event service/application window/environment 1000, in circumstances where user Susan's access to that service/application is prohibited (by first user Alan's calendar access setting for user Susan being set to "Prohibit" by way of the Calendar service access control 1408). The standard calendar service window display (as shown in FIG. 10) is replaced with a "disabled/ forbidden" message/alert 1602 indicating that the end user Alan has not allowed user Susan access to his calendar event service, as determined by first user Alan's association data, as described above.

Thus Susan's user device would display user Alan's dashboard interface, as generally shown in FIG. 5, but the second user Susan would only have access to those services/ applications allowed by the corresponding access permissions. In the described embodiment, each user device 200 also includes end-user functional components (e.g., end-user services/applications) that are not subject to access control because they are not specific to any particular user, such as a calculator server/application, help, crossword help, user guide, etc. If, having switched to a first user's environment to access services/applications of the first user's device, a second user selects one of these services/applications, then the second user's own corresponding service/application is displayed in the corresponding parts of the dashboard interface displayed on the second user's device 200. That is, the dashboard interface displayed on the second users device will have a mixture of services/applications of the end-user (where access has been allowed or prohibited), and where access is not subject to access control, the corresponding function selection buttons invoke the corresponding services/applications of the second user, rather than the first user.

In this way, any given remote (second) user of the system 100 can be provided access to one or more of the end-user's services/applications 300, as required or as appropriate for the corresponding relationship/association the second user to the end (first) user. For example, an immediate family member might be provided access to all of an aged or disabled end-user's services, whereas a user defined as having a Residential Manager role or association 408 with the end-user might be provided with access only to the end-user's Shopping service 312 and Alarms and Systems service 320. In other words, the system 100 generally provides access to the end-user's services/applications to a variety of different users and different types of users, but only to the extent appropriate to that user/service combination, thereby maintaining privacy and personal control, but also allowing appropriate levels of assistance from remotely located trusted users.

For example, in a home care context where a Resident requires immediate help to understand documents, appointments, messages, and/or alarms, the resident can simply select a control displayed on the screen of their device 200 to cause their device 202 to send a request for assistance to the device 200 of, for example, a family member or friend who can respond by switching the user context of their own device 200 to that of the resident end-user, and then provide the required assistance. The user context switching is achieved simply and immediately as described above, and without requiring any manual authentication on the part of either user.

Typically, the functions provided by each service/application of the end-user are the same for the end-user and a remote user given access to that service. However, in some cases, the functions can be different. For example, in the described embodiment, an Alarms service only provides to the end-user the ability to generate an alarm, whereas a Precinct Manager given management access to that same service is also able to collect and respond to any alarm received from any end user appliance type.

In addition to the user registration settings described above, the system 100 also provides additional user registration functions that allow the end user to select privacy options relating to the disclosure of information to other users. This privacy feature is enabled through the registration and user profile configuration management function, in that the system will export email and user name/details to the address book only if positively enabled by the end user.

The system 100 also allows each end user to enter content folder/album names related to specific services (e.g., images, documents) being used. Some example names for folders/albums containing images, for example, are shown in FIG. 8 as corresponding buttons 804, 712 in the service controls region 508.

Thus the system 100 provides user association switching functions that allow for:
 (i) the dynamic access of one user to another user's services/applications; for example, in a care precinct context, a carer can switch their user device 200 from displaying their individual carer services/applications to those of the Precinct Manager in order to see who the next resident is that requires attention.
 (ii)
  user types or roles to be assigned to other users. On the basis of that user role, different system functions are provided. For example, in the context of a user within a care facility or precinct having aged or handicapped residents, a user having a carer role/user type can see a list of the residents they support, a user with a Precinct Manager role/user type can see the call assist status indicators (caused by residents selecting the call assist button/control 538 of their user device 200) and any announcement messages sent by the precinct manager to the residents of a precinct.
 (iii) The automatic (random) generation of access control keys dedicated to a particular service/application for a particular user who can access that service/application.
 (iv) The dynamic removal of an association in order to prohibit further access to the corresponding server/application by the corresponding user/role. The association switching function displays a list of the possible associations. Included in the display are buttons that allow modification or suspension to the association data, as shown in FIG. 14.

It will be apparent from the above description that the system 100 provides a solution to the difficulties and complexities of current software and communications, particularly in the context of aged, frail, and/or less able users living largely independently. This is facilitated by providing easy to interpret large screen icons, meaningful service groupings, and touch screen operation in an integrated screen based dashboard for the control of electronic communications, entertainment and security that is easy to understand and use, even for inexpert users. Each device 200 provides a single platform for all communications and information sharing in a home or care facility setting, networked to carers, service providers and family members. The system 100 further provides for integrated peripheral equipment such as scanners, telephone adaptors, security cameras, alarm systems, medical appliances, etc, and for these peripherals to be controlled either locally or (where possible) remotely, using the remote access rules described above. Additional services/applications can be added to the system 100 as required, depending on the needs of the users of the system 100. In one embodiment, as part of the initial registration process, each first user (or other person acting on behalf of the first user) selects which particular services/applications are to be made available on the first user's user device 200. For example, additional services/applications dedicated to respective medical conditions can be made available on each user device 200. Thus a diabetes care service/application can be installed in order to manage the first user's diabetes are recording measurements of blood sugar levels, food intake, et cetera, and this information can then be remotely reviewed by an appropriately authorised second user of the system 100, such as the first user's doctor, for example. Many other such services/applications will be apparent to those skilled in the art.

In the described embodiments, the system 100 is implemented as a flat, nonhierarchical ad hoc peer-to-peer network of equal and identical devices 200. The processes described herein are implemented as a composite web services application that contains its own web browser, web server and address book, access control and user association processing for the services/functions 502 to 520. Thus the communication between user devices 200 uses the HTTP and HTTPS protocols, and in particular takes advantage of standard HTTP redirect mechanisms, as described below. However, in the described embodiments, the use of HTTP and a web browser/server architecture is hidden and is not apparent to users of the system 100.

There are several modes of operation of the system, allowing its use in: (i) an isolated environment, (ii) with connection only to the PSTN or ISDN, (iii) with one user device 200 acting as a central server for multiple other user devices 200 and being accessed through a network, or (iv) being part of a multi-host peer to peer network of user devices 200.

In order to provide a user to user context and sharing, the system 100 allows its graphical and easy to use image-based address book, as shown in FIG. 13, and corresponding association references to be stored on a single end user device 200, or on a service provider user device 200 such as the user device 200 of a Precinct Manager or a group level manager such as a carer or family member.

Each end user's information details of other users as described above, their address book, and their associations with other users of the system 100 can be defined on their own device and remain private to that device.

Alternatively, the end user's address book and association data can be hosted on another, locally connected, user device 200 (via a private IP network 220 using IP addresses and inter-device communication functions). In the case where a non-private internet connection is provided, each end user's address book and references to the end user's association data can be hosted on a domain level server 112, 416. In this specification, the term "reference" when used in the context of a 'reference to an association' should be understood as referring to information that is sufficient to identify the association between two user-device pairs (e.g., an association between FirstUser@FirstDevice and SecondUser@SecondDevice), the access details of which are stored only on the corresponding end user's device 200, and is referred to herein as "association data".

Where the end user's system is not connected to any other user devices 200 via a communications network 110, 220, the exchange of user image, message and document information can occur only through the physical exchange of removable storage devices (e.g., hard drives, flash memory cards and the like).

Once connected to a telephone network, the system 100 also allows for phone calls, images and documents to be transferred via its inbuilt fax service and USB-connected fax modem to externally located fax machines or other user devices 200. When an end user device 200 is either connected via a private IP network or the internet 110, interaction with other user devices 200 occurs to the extent allowed by their association data.

Where a single user device 200 is configured with multiple users accessing via locally (wired or wireless) user devices 200 and/or browser software, the system 100 is akin to a shared facility in a common room within the retirement village or in a family's home, and offers either multiple, individual service environments (i.e., interactive user environments) or the ability to share these environments by way of the association/access data.

Alternatively, and in particular for systems 100 with relatively large numbers of interacting user devices 200 (typically located at mutually remote physical locations), the system 100 can include a domain server 112, as shown in FIG. 1, for administration and to store the address book/user information and not the association data itself, but references to that association data 416. The domain server 112 can also act as an user/application level domain name server.

According to the configuration settings and permissions of the system 100, user devices 200 can either download information from the domain server 112, or (in smaller installations) from a user device 200 acting as a domain server (e.g., the user device 200 of the precinct manager).

Standard domain names or internet IP address details can be used to identify or find the user devices 200 and thus with further requests on these user devices 200, knowledge of other users, associations and systems can be obtained.

Each user of a device 200 can either partially or completely share their user address books, and references to their associations with other users. Typically, the system 100 is configured so that a family member, a retirement manager, a carer group or a medical centre hosts one or more domains wherein a domain server 112 of the system, as shown in FIG. 1, stores collective address book entries and collective references to the user associations (the latter also referred to herein as "association catalogue(s)"). In all cases, the association information of each end user as managed by that user and validated by that user's system is stored only on their own user device 200. Thus the trust of the system 100 is placed with those that allow that trust. The other (second) users when they search for a list of users who allow them access by an association are only provided with a reference to each such end user's associations if the association exists and is enabled. In the case of an end user device 102 configured to allow access to multiple second users 102 to 108, each second user's environment is provided only with a reference to that association. In the example of peer to peer networked user devices 200 on a private local area network in a care precinct, the references to each resident's association data are typically stored on the user device 200 of a nominated precinct manager function. Conversely, if the user devices 200 are connected to a public network, these references are typically stored on one or more domain level servers 112.

Regardless of which of the specific network configurations described above applies to a given user device 200, when an end user of a device 200 selects the Associates button 1002 to display a list of their own associations with other users, the device 200 downloads the association information from the domain server 112 in real time and then displays the user's associations. The device 200 displays two discrete lists, namely:
  (i) the associations with other users created by the end-user on their own user device in order to allow those other users access to the end user's device; and
  (ii) the associations that other users have created to allow the end-user access to the other users respective user devices 200; these latter associations are dynamically downloaded from the user device 200 or domain level server 112 that stores the references to those associations, as determined by the system configuration.

In the first case, these locally created associations can be viewed in their entirety, whereas in the second case each such association is displayed to the end user as an image and user name only, selection of which by the end-user results in corresponding access to the selected user's device 200 by way of a user environment context switch, as described above. Any such associations that have not been previously displayed by the end user are highlighted or displayed in a pop-up window to alert the end-user to the existence of these new associations.

The domain level server 112 when used to interconnect the user devices 200 stores each reference to an enabled association, including the hostnames of the two corresponding user devices 200 (and/or, where these have been assigned static network addresses, their network addresses), and the two corresponding usernames, indicating which is the source (username and hostname; e.g., user@hostname) and which is the destination (username and hostname). The reference also includes timestamps. The domain level server 112 also stores and synchronises address book information, namely the information defined on each end user's device 200 relating to the end user's name (username in the system 100), location (the node name of their physical user device 200 that is automatically allocated when their user device 200 is first registered with the system 100), email address, and, where provided in their profile information 638, their phone number and other contact details.

Figure 17:
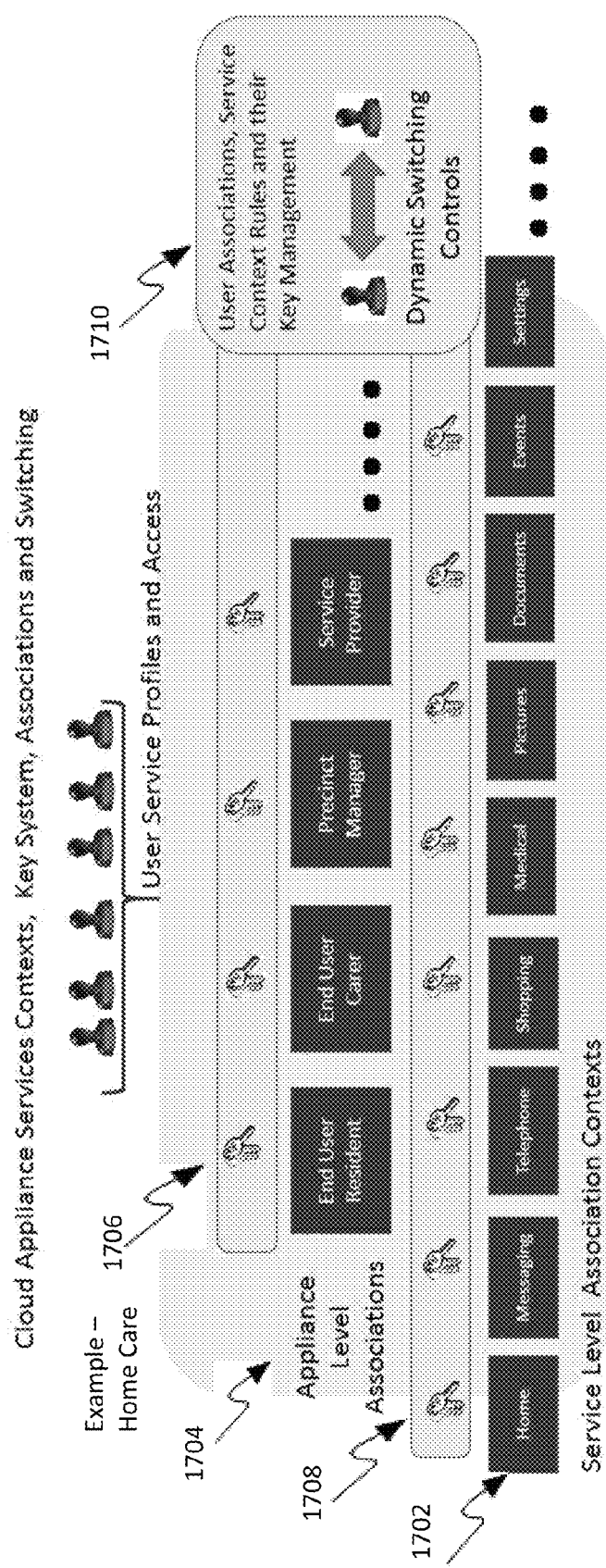
FIG. 17 is a schematic diagram illustrating the access controls provided by the system to selectively control access to individual end-user functional components (in the form of services/applications) of a (first) user based on relationships or associations between the first user and other (second) users of the system.

FIG. 17 is a schematic diagram providing a logical view of the system 100 in terms of its end-user level services/applications 1702 (e.g., the services/applications 304 to 316), its system level services 1704 (e.g., the alarms and settings services/applications 320, 322, system level security keys 1706, and user services/application access keys 1708, and the control of these access association level key components 1706, 1708 by user-to-user association control and switching functions 1710. In the described embodiments, the association control and switching functions 1710 are embedded in a web server component of each user device 200 that is architected (i.e., structured) in accordance with the system services and user services as described below.

Figure 18:
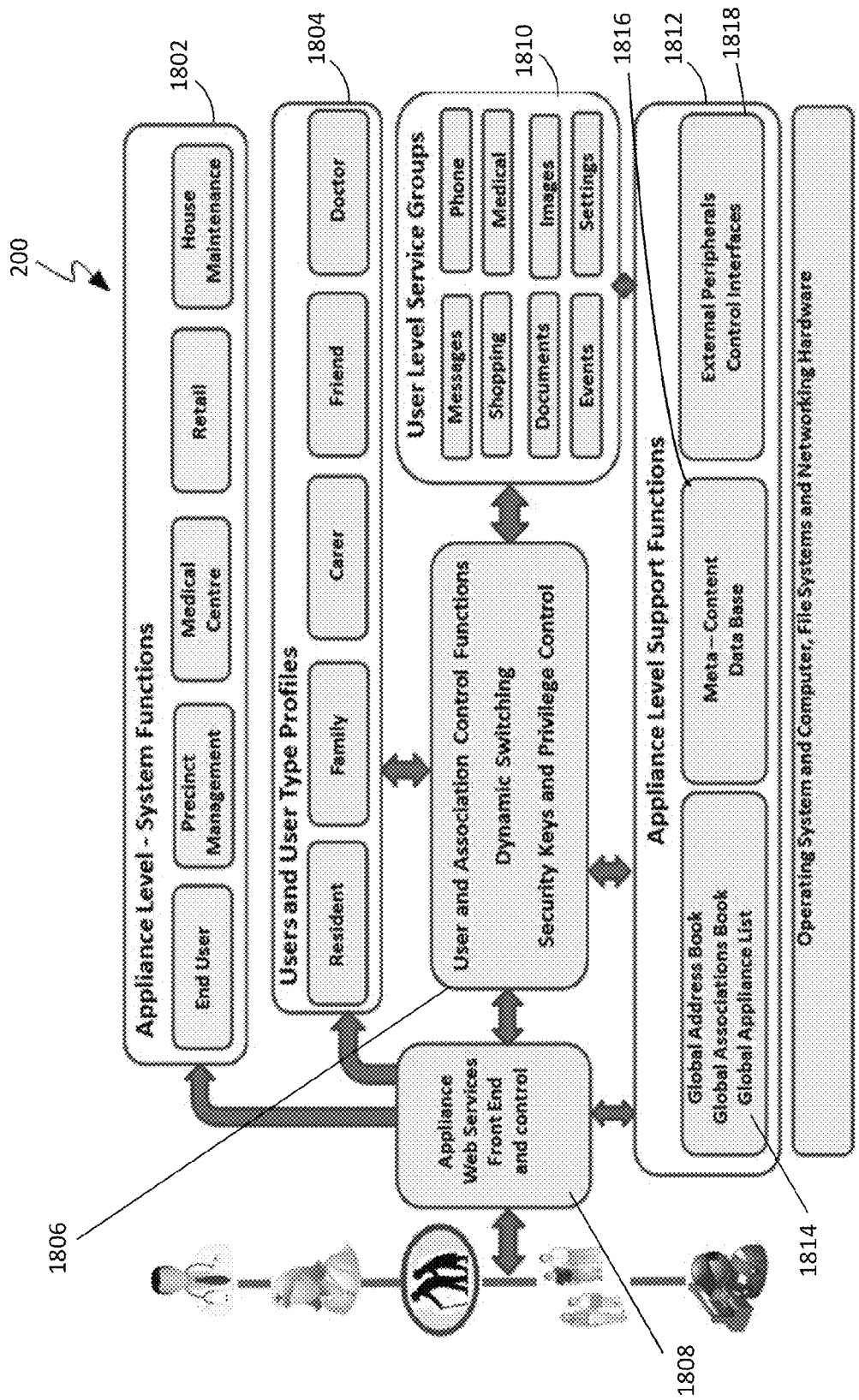
FIG. 18 is a block diagram illustrating the end-user and other functional components of each user device of the system.

FIG. 18 is a block diagram of the major functional components of each device 200. At the top of the diagram are the system level service/application components 1802 that actually provide the system level services of the device 200, classified by service type: in this example, the end user services as a system service context, precinct manager services and other service provider services (e.g., retail, medical centre, handyman). Below the services/applications are the user and user type service profile and data 1804 for resident, family, carer, friend, doctor—other user types are applied for handyman, etc. Additionally, each user type is assigned a corresponding 'display set' of a combination of system level and user level services/applications, allowing different user types to have different sets of services/applications displayed in their GUI.

For example, the set of system level services/applications that are defined for a handyman service provider which may be operated with user type of "friend". That the association information for the first user's handyman services in the first user's environment is entrusted to the second user that is simply denoted by the first user as that user's friend.

In other cases, the handyman service association could be set to a commercial supplier, and the nature and user type of that association will be different in that the user can simply ask to set an appointment for a handyman visit.

The full set of handyman services could include Electrical, Plumbing, Home Help, Painter, Cleaner, Gardener, and when these services/applications are selected through the end user's associations (as enabled by the handyman services owner), the end user can effectively see all that has been enabled for them. For example, those aged end users who have a high degree of self-help capabilities might browse through the handyman services and select what they want. Or where an aged end user does not have that level of capability, the handyman system association definition for that user may just allow them to tick a call for help box. In this case, the first user, through the association, accesses the handyman services system and either selects different services, materials and work form types and schedules a task using the handyman calendar event services, or simply ticks a box.

At the centre left of the diagram, the web services 1808 and access and association rule functions 1806 are shown, and these are coupled to the service group components 1810 that provide the end user services/applications described above, such as messaging, phone, documents, events, etc. These user level service group components are also user-type specific; for example, for a resident or family or friend they can be the services/applications 304 to 318 shown in FIG. 3. For Handyman/House Maintenance user types, these service groups will be different. Thus, for example, a shared handyman system facility within a retirement village can be associated with the residents and can (through their associations with individual residents) schedule handyman tasks as described above.

Below this are the support functions 1812, including global system data 1814, a meta-content database 1816, and peripheral interfaces and control logic (scanners, controllers, monitors, phone adaptors and USB devices) 1818.

The global system data 1814 includes:
  (i) a "global address book" 416 that holds either local address book information, including an image of each user, usernames, email addresses, phone numbers, IP addresses (if used) and user types, or if the system is configured to use a group address book, then it will be a global address book;
  (ii) an "association book" 416 that stores either local association information (user names, email addresses, keys and privileges as local user), or if the system is configured to use group association reference details, a global association information (catalogue) which contains the respective association references with their user and node names; and
  (iii) an "appliance list" that stores configuration management data such as node names, types and node software versions.

The meta content database 1816 stores the details of files and images and documents held in the system 100, including their associated metadata tags (as used for slideshow displays), and references to image and document thumbnail images (which are automatically generated) as used in the system displays described above.

For a given end-user, the remote (second) users' associations with the end-user are defined by a corresponding association data structure, as shown below, that stores information about each associated user, their access privileges for respective services/applications, and respective alpha-numeric keys which reference the user and the service environment being accessed for these privileges, as shown below. The user information includes for each user their username, GUID (a globally unique identifier of the structure (and hence the relationships)), an image (e.g., photograph), a status as to the association being enabled or disabled (or in a locked, suspended, or barred state), and, optionally, additional key/algorithm data for use where the user has selected a particular cryptographic encryption method.

In the described embodiments, the association data structure is of the following form:

```
struct AssocArray {
// Basic Header data
  char AssocName[MAX_ASSOCS][STRLEN];
    char AssocGuid[MAX_ASSOCS][STRLEN];
    char AssocPw[MAX_ASSOCS][STRLEN];
    char AssocImg[MAX_ASSOCS][STRLEN];
      char AssocStatus[MAX_ASSOCS][STRLEN];
    char AssocSecurity[MAX_ASSOCS][STRLEN];
// Basic Services/Application Names - (only 3 shown)
    char AssocSvcGrp0Name[MAX_ASSOCS][STRLEN];
  char AssocSvcGrp1Name[MAX_ASSOCS][STRLEN];
    char AssocSvcGrp2Name[MAX_ASSOCS][STRLEN];
.......................
// Basic Services/Application Privileges - (only 3 shown)
    char AssocSvcGrp0Privs[MAX_ASSOCS][STRLEN];
  char AssocSvcGrp1Privs[MAX_ASSOCS][STRLEN];
    char AssocSvcGrp2Privs[MAX_ASSOCS][STRLEN];
.......................
// Basic Services/Application Keys - (only 3 shown)
    char AssocSvcGrp0Key[MAX_ASSOCS][STRLEN];
  char AssocSvcGrp1Key[MAX_ASSOCS][STRLEN];
    char AssocSvcGrp2Key[MAX_ASSOCS][STRLEN];
....................
};
```

For simplicity of description only, the shared access system 100 has been generally described above in terms of each user device 200 having only a single interactive user environment for a single user or owner of the user device 200. However, each user device 200 can be configured to have multiple user accounts and respective interactive user environments for respective users.

When a user selects the change user context control on their user device 200, the following steps are performed:
  1. The target (end) user's AssocName association reference (e.g., ToUsername@ToHostname, FromUsername@FromHostname) is examined to see if the target user is a local user and sharing the same system (i.e., the Hostname is the current user device 200) or on a connected system which is determined by comparing node names, and/or IP addresses.
  2. If the target user is on the same physical system, a session switch is initiated with the current (second) user's access keys swapped for the target (end) user's access keys from the latter's association data, and the existing second user's session context is continued with those new keys, but using (to the extent allowed by the corresponding association data) the services/applications of the target user on the local device 200.
3. If the target user is on a different user device 200, based on the global association reference data (which may be on this user device 200 or another user device 200 or the domain server 112, as defined by the system connection type details such as its IP address or URI and its system type details such as a resident, operator or carer type system), an HTTP redirected request is made to the target device 200 to authenticate the requestor (e.g., username@hostname) as a remote associate and to create a remote user session for the requestor using the association data held on the target user device 200. Once the association session is vetted and established by the target user's device 200, the second user's device 200 receives an HTTP reply including HTML and JavaScript™ scripting language data that the second user's device 200 processes to display a graphical user interface representing the target user device's environment home screen, typically modified as described above by any corresponding association access control data that limits the access of the requestor to the target users services/applications.
4. As the target device 200 now stores a session reference which contains an unique identifier for the session (a randomly generated number), a session type indicating it is an association session and not a owning user's session, a reference to the association, data and statistical data (for session activity and logging reasons) for the second user, subsequent requests by the same requestor to that target device 200 for access to services/applications are then vetted against that session reference in terms of the second user, their session identifier and the associated service/application access permissions, as specified by the association data which can of course be changed at any time by the first user. If the association data is modified or disabled, then the second user is informed that such an event has occurred. Thus every second user access is vetted as to the current state of the session level linkage to its association data and its linkage to the access privileges defined by the association data.
5. Each associated session between a pair of user devices 200 as described above uses a private encrypted peer to peer connection to ensure security is maintained.
6. Each session between associated users is logged to enable session tracing and reporting.
7. When the association session is terminated by the second user through a—"Association Home" button/control (not shown), the end user's original keys are returned into the session control function 1306 of the end user's device 200 and the original session is resumed.

Although, for simplicity of description, the system 100 has been described above in terms of a single end ("first") user sharing their user device 200 with other ("second") users 104 to 108, it should be understood that any user of a user device 200 can allow one or more other users to access to their device 200. Thus, for example, one of the second users 108 could share one or more of their services/functions with any of the other users 102 to 106.

The user devices/appliances 200 described herein involve the following features:

Each device/appliance employs both a standard web browser and its own web services engine, session control and access control system (as described above), and therefore a single end user's activities are generally internal to his or her device, relying on the device's client and server functionality. With user-user interaction, while their interactions are performed on a client-server basis, the networked system governance interactions, including the system's address book and access control management is performed on a separate, secure channel established between the two servers. A remote user's access control data (with respect to that remote user accessing the end user's device) resides with the end user's server, and when the end user's server is accessed by that, the external user is vetted by that end user's server. Thus an aged and/or disabled user simply allows others to access their system on their understanding of the need to know, role (carer, doctor) or personally trusted basis.

The user management on each device is via an address book which can be dedicated to the user concerned or shared with other users in the system if that is permitted.

The applications/services used by each user are of a common set, meaning that different users have the same capabilities and familiarity with what these services are and do and how they can be shared through the access control methods described herein.

user-user sharing over the server-server connection is allowed via the user of association based access control information as established by the owning end user and dynamically managed by that end user.

Many modifications will be apparent to those skilled in the art without departing from the scope of the present invention.

The invention claimed is:

1. A shared access user appliance or device, including:
   a client component;
   a server component;
   a plurality of interactive user components configured to provide respective different interactive functions to a user ("the first user") of the shared access user appliance or device via respective graphical user interfaces of the interactive user components;
   an interactive access management component configured to allow the first user to select one or more other users ("second users") of one or more shared access user appliances or devices, and to independently select whether to grant or deny access to each of the different interactive user components of the first user for each of the selected second users;
   at least one access control component configured to generate access control data corresponding to the first user's selections, and to independently grant or deny access to each of the interactive user components of the first user for each of the second users;
   wherein the server component is configured to generate an appliance graphical user interface representing an interactive user environment of the first user for display to the first user, the interactive user environment including independently selectable graphical objects representing the interactive user components of the first user, selection of each said graphical object causing the server to modify at least a corresponding portion of the appliance graphical user interface to include the graphical user interface of the corresponding interactive user component of the first user; and
   wherein the server component is further configured to receive requests to access corresponding ones of the interactive user components of the first user from other users of shared access user appliances or devices, and, for each said request, to send a graphical user interface of the corresponding interactive user component of the first user for display on the corresponding shared access user appliance or device of the corresponding second user only if the generated access control data indicates that the first user has allowed the corresponding second user access to the corresponding interactive user component of the first user.

2. The shared access user appliance or device of claim 1, wherein the requests are received from shared access user appliances or devices of the second users via a communications network, and the server component is configured to send the graphical user interface of the corresponding interactive user component of the first user to the shared access user appliance or device of the second user via the communications network.

3. The shared access user appliance or device of claim 1, wherein said interactive functions of said first user include one or more of: an alarm or domestic or electrical appliance control function, a messaging function, an event calendar function, a telephone function, a document management function, a picture management function, an online shopping function, a medical and prescription management function, and an address book function.

4. The shared access user appliance or device of claim 1, wherein said interactive functions of said first user include at least three functions of: an alarm or domestic or electrical appliance control function, a messaging function, an event calendar function, a telephone function, a document management function, a picture management function, an online shopping function, a medical and prescription management function, and an address book function.

5. The shared access user appliance or device of claim 1, wherein said interactive functions of said first user include: an alarm or domestic or electrical appliance control function, a messaging function, an event calendar function, a telephone function, a document management function, a picture management function, an online shopping function, a medical and prescription management function, and an address book function.

6. The shared access user appliance or device of claim 1, wherein the at least one access control component is configured to independently grant or deny access to each of the different interactive user components of the first user on the basis of a role or relationship of the corresponding second user relative to the first user, the role or relationship being defined by the access control data.

7. The shared access user appliance or device of claim 1, wherein the interactive access management component is configured to allow the first user to select the one or more second users by selecting respective images of the one or more other users from an image-based address book that is synchronized across the shared access user appliance or device of the first user and shared access user appliances or devices of other users.

8. In a user appliance or device including:
a client component;
a server component;
a plurality of interactive user components configured to provide respective different functions to a user ("the first user") of the shared access user appliance or device via respective graphical user interfaces of the interactive user components;
an interactive access management component; and
at least one access control component;
a shared access process, including:

generating, by the server component, an appliance graphical user interface representing an interactive user environment of the first user for display to the first user, the interactive user environment including independently selectable graphical objects representing the interactive user components of the first user, selection of each said graphical object causing the server to modify at least a corresponding portion of the appliance graphical user interface to include the graphical user interface of the corresponding interactive user component of the first user;

receiving, by the interactive access management component and from the first user via the client component, access selection data representing the first user's selections of one or more second users and, for each of the selected second users, whether to independently grant or deny the second user access to each of the different interactive user components of the first user;

processing, by the at least one access control component, the access selection data to generate access control data corresponding to the first user's selections;

receiving, by the server component, requests to access corresponding ones of the interactive user components of the first user from second users of respective shared access user appliances or devices;

processing, by the at least one access control component, each of the received requests and the generated access control data to determine whether to grant or deny the corresponding second user access to the corresponding one of the interactive user components of the first user; and only if said access is granted, the server component sending to the corresponding second user the graphical user interface of the corresponding interactive user component of the first user for display on the corresponding shared access user appliance or device of the corresponding second user.

9. The shared access process of claim 8, wherein the requests are received from the shared access user appliances or devices of the second users via a communications network, and the server component sends the graphical user interface of the corresponding interactive user component of the first user to the shared access user appliance or device of the second user via the communications network.

10. The shared access process of claim 8, wherein said functions of said first user include one or more of: an alarm or domestic or electrical appliance control function, a messaging function, an event calendar function, a telephone function, a document management function, a picture management function, an online shopping function, a medical and prescription management function, and an address book function.

11. The shared access process of claim 8, wherein said functions of said first user include at least three functions of: an alarm or domestic or electrical appliance control function, a messaging function, an event calendar function, a telephone function, a document management function, a picture management function, an online shopping function, a medical and prescription management function, and an address book function.

12. The shared access process of claim 8, wherein said functions of said first user include: an alarm or domestic or electrical appliance control function, a messaging function, an event calendar function, a telephone function, a document management function, a picture management function, an online shopping function, a medical and prescription management function, and an address book function.

13. The shared access process of claim 8, wherein the processing of each of the received requests and the generated access control data includes determining whether to grant or deny the corresponding second user access to the corresponding one of the interactive user components of the first user on the basis of a role or relationship of the corresponding second user relative to the first user, the role or relationship being defined by the access control data.

14. The shared access process of claim 8, wherein the access selection data represents the first user's selections of one or more images of the second users from an image-based address book, and the process includes synchronizing the image-based address book across the shared access user appliance or device of the first user and shared access user appliances or devices of other users.

15. A shared access process executed by a device of a first user, including:
   accessing first graphical user interface data representing a graphical user interface of the first user for display on said device of said first user, the graphical user interface including a plurality of selectable components selectable by said first user to independently access respective interactive functions of said first user;
   said graphical user interface of said first user including one or more access control components that allow the first user to generate access control data that is used to independently determine whether to allow or deny remote access to each of said interactive functions of said first user by at least one second user over a communications network;
   receiving, from a device of a said second user via the communications network, request data representing requests of the second user to access respective ones of the interactive functions of said first user;
   processing said request data and said access control data to independently determine, for each of said requests, whether to allow or deny access of said second user to the corresponding interactive function of said first user; and
   sending, to said device of said second user, second graphical user interface data representing a modified version of the graphical user interface of the first user for display on said device of said second user, such that the modified graphical user interface of the first user does not allow access to those interactive functions of said first user for which access was denied, and allows access to those interactive functions of said first user for which access was granted.

16. The process of claim 15, wherein said plurality of selectable components are independently selectable by said first user to cause respective further graphical user interfaces to be displayed to said first user, each of said further graphical user interfaces providing access to a corresponding one of said interactive functions of said first user.

17. The process of claim 16, wherein selection of a selected one of said selectable components causes the corresponding one of the further graphical user interfaces to be displayed together with at least a portion of the graphical user interface of the first user.

18. The process of claim 15, wherein said functions of said first user are selected from: an alarm or domestic or electrical appliance control function, a messaging function, an event calendar function, a telephone function, a document management function, a picture management function, an online shopping function, a medical and prescription management function, and an address book function.

19. The process of claim 15, wherein said functions of said first user include at least three functions selected from: an alarm or domestic or electrical appliance control function, a messaging function, an event calendar function, a telephone function, a document management function, a picture management function, an online shopping function, a medical and prescription management function, and an address book function.

20. The process of claim 15, wherein the access control data is used to independently allow or deny said remote access of each of said plurality of second users based on a relationship of the second user to the first user.

21. The process of claim 15, wherein the access control data is owned and stored only on said device of said first user, but corresponding user and device identification data of said access control data is stored on a server in communication with said device of said first user and said device of said second user.

22. The process of claim 21, wherein said device of said second user can access said server to determine said user and device identification data of said access control data, and can access said device of said first user based on said user and device identification data of said access control data.

23. The process of claim 22, wherein said server redirects said device of said second user to said device of said first user based on said user and device identification data of said access control data.

24. The process of claim 21, wherein said server includes an HTTP server.

25. The process of claim 21, wherein said second graphical user interface data is sent to said device of said second user over a first secure communications channel, and access control and address book information is communicated to said device of said second user over a second secure communications channel.

26. At least one non-transitory computer readable storage medium having stored thereon processor executable instructions that, when executed by at least one processor of a computing device, cause the at least one processor to execute the process of claim 8.

27. The at least one non-transitory computer readable storage medium of claim 26 wherein the processor executable instructions including instructions to boot the at least one processor such that the processor executable instructions constitute a software appliance.

28. A shared access user device, including at least one processor, a memory in communication with the at least one processor, and a network interface for sending data to and receiving data from a communications network, the at least one processor being configured to execute the process of claim 8.

29. The shared access user device of claim 28, configured as a computing appliance.

30. A shared access system, including a plurality of shared access user devices as claimed in claim 28, the shared access user devices being in mutual communication via a communications network.

31. The shared access system of claim 30, including a domain server in communication with the plurality of shared access user devices, the domain server providing access to a shared user address book that includes identifiers of the first and second users and corresponding shared access user devices.

32. The shared access appliance, device, system or process of claim 1, wherein each shared access user appliance or device includes a touch screen.

33. The shared access appliance, device, system or process of claim 32, wherein each shared access user device is in the form of a touch screen tablet device.

34. The shared access process or system of claim 15, wherein the interactive functions of said first user include at least three of domestic or electrical appliance control, telephone, messaging, calendar, document, image, shopping, medical, and green cross functions.

35. The shared access process or system of claim 15, wherein the interactive functions of said first user include at least five of domestic or electrical appliance control, telephone, messaging, calendar, document, image, shopping, medical, and green cross functions.

36. The shared access process or system of claim 15, wherein the interactive functions of said first user include domestic or electrical appliance control, telephone, messaging, calendar, document, image, shopping, medical, and green cross functions.

37. The shared access appliance, device, process or system of claim 1, wherein the access control components include an interactive address book component that allows the first user to select the at least one second user from a list of users of a shared user address book that is synchronized across the device of the first user and devices of respective second users.

38. The shared access appliance, device, process or system of claim 1, where the shared access connections between user devices are displayed to a user in the context of the users that can access said user's device and in the context of the other users whose devices can be accessed by said user.

39. The shared access appliance, device, process or system of claim 1, where a shared access session displays to the second user, graphical indicators that inform said user that access to a selected function has been denied by the said first user.

40. A shared access device, including:
 at least one processor;
 a memory in communication with the at least one processor;
 a network interface for sending data to and receiving data from a communications network; and
 a non-volatile storage medium having stored thereon instructions that, when executed by the at least one processor, cause the at least one processor to execute the steps of:
accessing first graphical user interface data representing a graphical user interface of a first user for display on said shared access device of said first user, the graphical user interface including a plurality of selectable components selectable by said first user to access respective interactive functions of said first user;
said graphical user interface of said first user including access control components that allow the first user to generate access control data that is used to independently allow or deny access of each of a plurality of second users to each of said interactive functions of said first user over a communications network;
receiving, from a device of one of said second users via the communications network, request data representing requests of the second user to access respective ones of the interactive functions of said first user;
processing said request data and said access control data to independently determine, for each of said requests, whether to grant or deny access of said second user to the corresponding interactive function of said first user; and
sending, to said device of said second user, second graphical user interface data representing a modified version of the graphical user interface of the first user for display on said device of said second user, such that the modified graphical user interface of the first user does not allow access to those interactive functions of said first user for which access was denied, and allows access to those interactive functions of said first user for which access was granted.

41. The shared access device of claim 40, including a web server component that executes said steps of receiving and processing, and a web browser component that receives and processes said first graphical user interface data to generate said graphical user interface of the first user.

* * * * *